(12) United States Patent
Kounosu et al.

(10) Patent No.: US 10,151,272 B2
(45) Date of Patent: Dec. 11, 2018

(54) FUEL SUPPLY DEVICE AND FUEL SUPPLY METHOD

(71) Applicant: Mitsui Engineering & Shipbuilding Co., Ltd., Chuo-ku, Tokyo (JP)

(72) Inventors: Makoto Kounosu, Tokyo (JP); Seiichi Kitamura, Tamano (JP); Renzo Kanda, Tokyo (JP)

(73) Assignee: Mitsui Engineering & Shipbuilding Co., Ltd. (JP)

( * ) Notice: Subject to any disclaimer, the term of this patent is extended or adjusted under 35 U.S.C. 154(b) by 0 days.

(21) Appl. No.: 15/566,689

(22) PCT Filed: Apr. 7, 2016

(86) PCT No.: PCT/JP2016/061406
§ 371 (c)(1),
(2) Date: Oct. 13, 2017

(87) PCT Pub. No.: WO2016/167175
PCT Pub. Date: Oct. 20, 2016

(65) Prior Publication Data
US 2018/0080413 A1  Mar. 22, 2018

(30) Foreign Application Priority Data
Apr. 13, 2015 (JP) ................. 2015-081622

(51) Int. Cl.
*F02M 15/00* (2006.01)
*F02M 21/02* (2006.01)
(Continued)

(52) U.S. Cl.
CPC ........ *F02M 21/0218* (2013.01); *F02M 37/08* (2013.01); *F02M 37/12* (2013.01);
(Continued)

(58) Field of Classification Search
CPC ........ F02M 59/02; F02M 59/26; F02M 37/06; F02M 37/08; F02M 37/12; F02M 39/02; F02M 57/023; F04B 49/06; F04B 9/042
(Continued)

(56) References Cited

U.S. PATENT DOCUMENTS

| 4,173,437 A | * | 11/1979 | Leka | .................. | F04B 1/02 417/521 |
| 4,448,692 A | * | 5/1984 | Nakamoto | ............. | B01D 15/14 210/101 |

(Continued)

FOREIGN PATENT DOCUMENTS

| JP | 2003-510515 | 3/2003 |
| JP | 2004-150402 A | 5/2004 |

(Continued)

OTHER PUBLICATIONS

International Search Report for International Application No. PCT/JP2016/061406 dated May 17, 2016, 4 pages, Japan.

*Primary Examiner* — John Kwon
(74) *Attorney, Agent, or Firm* — Thorpe North & Western

(57) ABSTRACT

A fuel supply device for supplying fuel into a combustion chamber of an internal combustion engine is provided. The device includes: a low pressure fuel supply pipe to which a low pressure fuel is supplied; a high pressure fuel supply pipe to which high pressure fuel to be supplied into the combustion chamber is supplied; fuel supply units provided between the low pressure fuel supply pipe and the high pressure fuel supply pipe, each of the fuel supply units being configured to boost the fuel in the low pressure fuel supply pipe and supply the boosted fuel to the high pressure fuel supply pipe; and a control unit configured to control the fuel supply units. The control unit controls the fuel supply units
(Continued)

such that a total amount of ejection of the fuel ejected from the fuel supply units per unit time is close to a constant value.

8 Claims, 11 Drawing Sheets

(51) Int. Cl.
    *F02M 59/44*     (2006.01)
    *F02M 37/08*     (2006.01)
    *F02M 37/12*     (2006.01)
    *F04B 49/06*     (2006.01)
    *F02M 59/08*     (2006.01)

(52) U.S. Cl.
    CPC ............ *F02M 59/08* (2013.01); *F02M 59/44* (2013.01); *F04B 49/06* (2013.01)

(58) Field of Classification Search
    USPC ....... 123/434, 435, 438, 675, 681, 682, 445, 123/446, 447, 456, 468, 478, 480
    See application file for complete search history.

(56) References Cited

U.S. PATENT DOCUMENTS

| | | | | |
|---|---|---|---|---|
| 5,647,310 | A | * | 7/1997 | Kimura ..................... F01L 1/08 123/90.6 |
| 5,688,110 | A | * | 11/1997 | Djordjevic ............. F02M 37/06 417/254 |
| 6,694,952 | B1 | * | 2/2004 | Yamazaki ............. F02M 59/102 123/496 |
| 2002/0085921 | A1 | | 7/2002 | Gram et al. |
| 2003/0029424 | A1 | * | 2/2003 | Ryuzaki ................. F02M 59/08 123/456 |
| 2004/0105759 | A1 | | 6/2004 | Gram et al. |
| 2004/0164013 | A1 | | 8/2004 | Takao et al. |
| 2009/0071974 | A1 | | 3/2009 | Ikushima |
| 2015/0369228 | A1 | | 12/2015 | Kounosu et al. |
| 2018/0010588 | A1 | * | 1/2018 | Ohta .................. F02M 37/0052 |
| 2018/0080413 | A1 | * | 3/2018 | Kounosu ............. F02M 21/0218 |
| 2018/0119658 | A1 | * | 5/2018 | Kounosu ................ F02M 37/08 |

FOREIGN PATENT DOCUMENTS

| | | |
|---|---|---|
| JP | 2005-042619 | 2/2005 |
| JP | 2005-504927 | 2/2005 |
| JP | 2007-113433 | 5/2007 |
| JP | 4711328 | 6/2011 |
| JP | 5519857 | 6/2014 |
| WO | WO 2001/23752 | 4/2001 |
| WO | WO 2006/085433 | 8/2006 |
| WO | WO 2015/099106 | 7/2015 |

\* cited by examiner

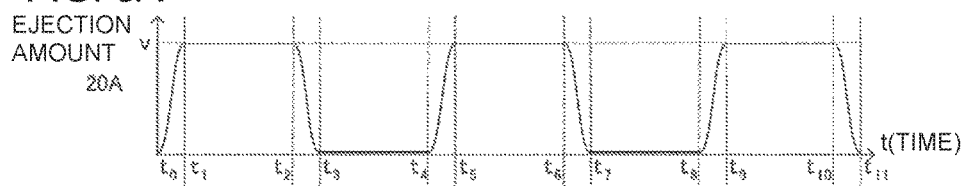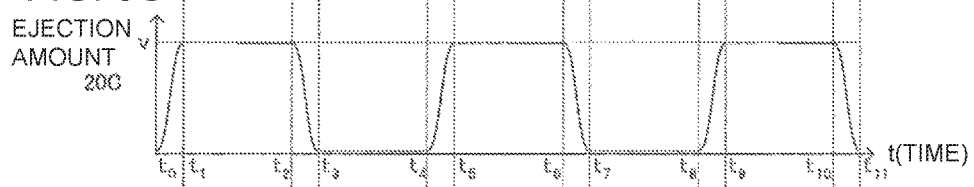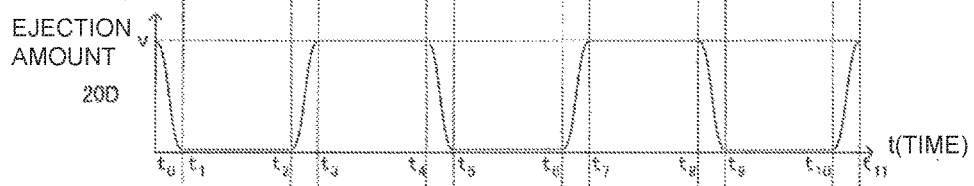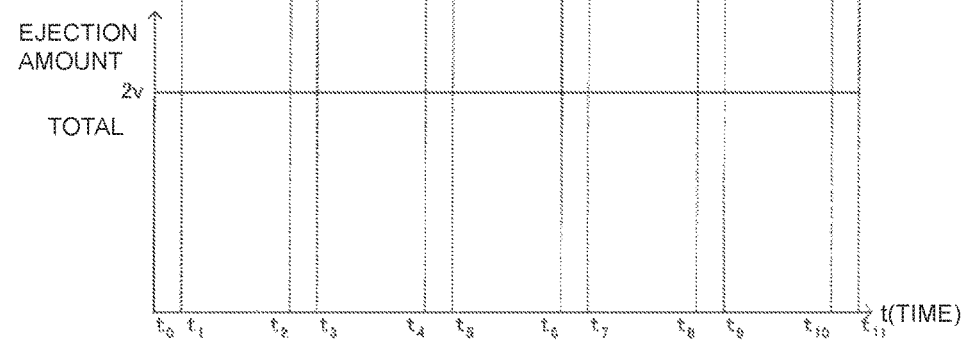

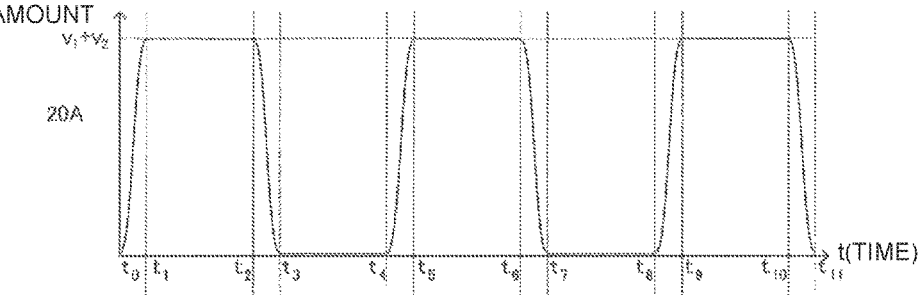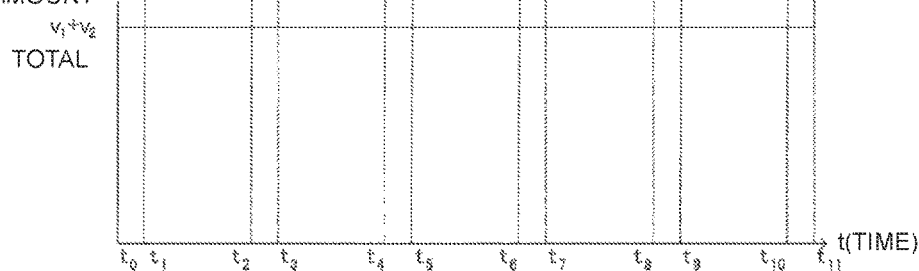

FUEL SUPPLY DEVICE AND FUEL SUPPLY METHOD

TECHNICAL FIELD

The present technology relates to a fuel supply device and a fuel supply method for supplying fuel to an internal combustion engine such as a diesel engine.

BACKGROUND ART

In conventional ships, a two-stroke low speed diesel engine is used. The diesel engine can output at low speeds and is driven, directly connected to a propeller.

In recent years, natural gas with low $NO_x$ and $SO_x$ emissions has received attention as a fuel for low speed diesel engines. By injecting high pressure natural gas as a fuel into a combustion chamber of a low speed diesel engine and burning it, an output can be obtained with high heat efficiency.

For example, a reciprocating pump is driven by converting the rotational motion to the reciprocating motion using a crankshaft. In a case where a piston of the reciprocating pump is driven using the crankshaft, since the piston stroke is determined by the crankshaft, it is not possible to freely adjust the piston stroke. In addition, in a case where a plurality of reciprocating pumps is driven by an identical crankshaft, it is difficult to independently control the individual reciprocating pumps.

Meanwhile, Japanese Unexamined Patent Application Publication No. 2005-504927 ("JP 2005-504927") describes a device that boosts liquid fuel using a reciprocating pump and supplies the boosted fuel to the engine. In the device in JP 2005-504927, a piston of the reciprocating pump is driven in the left-right direction, and a "linear hydraulic motor" (hydraulic cylinder unit) is used as a linear actuator that drives a piston. In JP 2005-504927, the moving direction of the piston of the reciprocating pump is switched by switching, with a direction switching valve, the direction of the hydraulic oil supplied from the hydraulic pump to the hydraulic cylinder unit. With the use of the hydraulic cylinder unit, it is possible to drive the reciprocating pump at a lower speed than the case where the crankshaft is used. Moreover, this method has an advantage that the piston stroke can be controlled so as to allow the piston to move at a constant speed.

Incidentally, the fuel supply device that supplies fuel to the internal combustion engine using a reciprocating pump has a problem that pulsation occurs due to a timing at which the fuel is ejected from the reciprocating pump, with various causes.

FIGS. 11A, 11B, and 11C are diagrams illustrating examples of temporal changes in the ejection amounts of the individual reciprocating pumps in a case where three reciprocating pumps are driven using the crankshaft. FIG. 11D is a diagram illustrating a temporal change of the total ejection amounts of FIGS. 11A, 11B, and 11C. Since the rotational motion of the crankshaft is converted into the rectilinear motion of the piston, each piston moves in a sinusoidal manner, and the temporal change of the ejection amount of each of the reciprocating pumps also becomes sinusoidal. While shifting the ejection timings of the three reciprocating pumps by ⅓ cycles, as illustrated in FIG. 11D, decreases the temporal change of the total ejection amount, it is difficult to completely eliminate the temporal change, leading to occurrence of pulsation. Moreover, while reducing the rotation speed gradually decreases the amplitude of the waveform of the ejection amount, it is difficult to completely eliminate the temporal change of the total ejection amount.

JP 2005-504927 describes an example in which generation of pressure pulse is reduced by controlling the piston stroke so as to allow the piston to move at a constant speed. In the device in JP 2005-504927, however, the pressure increases at the downstream side of the reciprocating pump at the time of fuel ejection compared with the time of suction, leading to a problem of generation of pulsation corresponding to the reciprocating cycle of the piston.

SUMMARY

The present technology provides a fuel supply device and a fuel supply method capable of reducing pulsation of fuel pressure caused by a reciprocating pump.

The first aspect of the technology is a fuel supply device for supplying fuel into a combustion chamber of an internal combustion engine, the fuel supply device including:

a low pressure fuel supply pipe to which a low pressure fuel is supplied;

a high pressure fuel supply pipe to which high pressure fuel to be supplied into the combustion chamber is supplied;

a plurality of fuel supply units provided between the low pressure fuel supply pipe and the high pressure fuel supply pipe, each of the fuel supply units being configured to suck and boost the fuel in the low pressure fuel supply pipe and supply the boosted fuel to the high pressure fuel supply pipe; and a control unit configured to generate a control signal to control the plurality of fuel supply units, wherein each of the fuel supply units includes:

a linear actuator;

a reciprocating pump having a boosting piston driven by the linear actuator to reciprocate in an axial direction, the reciprocating pump being configured to suck the fuel when the boosting piston moves in a first direction in the axial direction and configured to boost and eject the fuel when the boosting piston moves in a second direction in the axial direction; and a controller controlled by the control unit and configured to drive the linear actuator, and the control unit being configured to control, via the controller, the plurality of fuel supply units by outputting the control signal for driving the linear actuator, the control signal including information that a reciprocating cycle time of the boosting piston is in common in the plurality of fuel supply units, and that acceleration of the boosting piston in the second direction in one fuel supply unit is started, when deceleration of the boosting piston in the second direction in at least one other fuel supply unit is started, and acceleration of the boosting piston in the second direction in one fuel supply unit is finished, when deceleration of the boosting piston in the second direction in at least one other fuel supply unit is finished, in order to keep a total amount of ejection of the fuel ejected from the plurality of fuel supply units per unit time a constant value by decreasing an ejection amount of the fuel per unit time by decelerating a moving speed of the boosting piston in the second direction in the other fuel supply unit while an ejection amount of the fuel per unit time from the one fuel supply unit increases by accelerating a moving speed of the boosting piston in the second direction during one reciprocation movement of the boosting piston of the at least one fuel supply unit, and that deceleration of the boosting piston in the second direction in the one fuel supply unit is started when acceleration of the boosting piston in the second direction in at least the one other fuel supply unit is started, and deceleration of the boosting piston in the second direction in the one fuel supply unit is finished when acceleration of the boosting piston in the second direction in at least one other fuel supply unit is finished, in order to keep a total amount of ejection of the fuel ejected from the plurality of fuel supply units per unit time a constant value by increasing an ejection amount of the fuel per unit time by accelerating a moving speed of the boosting piston in the second direction in the other fuel supply unit while an ejection amount of the fuel per unit time from the one fuel supply unit decreases by decelerating a moving speed of the boosting piston in the second direction during one reciprocation movement of the boosting piston in the one fuel supply unit.

The control unit is preferably configured to control the plurality of fuel supply units by outputting the control signal, the control signal including information that a sum of an increase amount of an ejection amount of the fuel from a fuel supply unit or fuel supply units in which the ejection amount of the fuel is increasing matches a sum of a decrease amount of an ejection amount of the fuel from another fuel supply unit or other fuel supply units in which the ejection amount of the fuel is decreasing.

The linear actuator is preferably a hydraulic cylinder unit and preferably includes:

a hydraulic cylinder having a hydraulic fluid accommodation space for accommodating hydraulic fluid and arranged such that an axial direction of the hydraulic cylinder is aligned with the axial direction of the boosting piston;

a hydraulic piston movably arranged in the axial direction within the hydraulic cylinder, and configured to partition the hydraulic fluid accommodation space into a first chamber and a second chamber;

a piston rod configured to couple the hydraulic piston with the boosting piston;

a hydraulic pump configured to move the hydraulic piston in a first direction in the axial direction by supplying hydraulic fluid to the first chamber and to move the hydraulic piston in a second direction in the axial direction by supplying hydraulic fluid to the second chamber; and an electric motor configured to drive the hydraulic pump such that the hydraulic piston reciprocates in the axial direction, and the controller is configured to control a movement of the hydraulic piston within the hydraulic cylinder by driving the electric motor.

Preferably, the hydraulic cylinder unit further includes:

a first hydraulic pipe with an internal space closed therein, the first hydraulic pipe having one end connected to the hydraulic pump and the other end connected to the first chamber and configured to direct all the hydraulic fluid ejected from the hydraulic pump toward the first chamber for supply and configured to return all the hydraulic fluid discharged from the first chamber toward the hydraulic pump; and a second hydraulic pipe with an internal space closed therein, the second hydraulic pipe having one end connected to the hydraulic pump and the other end connected to the second chamber and configured to supply to the second chamber the hydraulic fluid of an identical amount discharged from the first chamber and configured to discharge from the second chamber the hydraulic fluid of an identical amount supplied to the first chamber.

Preferably, the piston rod extends from the hydraulic piston in the first direction and protrudes to the outside of the first chamber and extends from the hydraulic piston in the second direction and protrudes to the outside of the second chamber, and the cross-sectional area of the piston rod perpendicular to a longitudinal direction of the first chamber is equal to the cross-sectional area of the piston rod perpendicular to a longitudinal direction of the second chamber.

The hydraulic pump preferably supplies hydraulic fluid to the second chamber such that the pressure of the fuel ejected from the reciprocating pump is 5 MPa to 100 MPa.

The linear actuator may be an electric cylinder unit. The electric cylinder unit preferably includes:

an electric motor;

a ball nut configured to rotate by a power of an electric motor; and a ball screw to which the ball nut is screwed, being coupled with the boosting piston, an axial direction of the ball screw is aligned with the axial direction of the boosting piston, and configured to move in the axial direction of the ball screw by rotation of the ball nut, and the controller is configured to control a movement of the ball screw in the axial direction by controlling the electric motor.

The second aspect of the technology is a fuel supply method for supplying fuel into a combustion chamber of an internal combustion engine. The fuel supply method includes:

sucking and boosting fuel in a low pressure fuel supply pipe to which a low pressure fuel is supplied and supplying the boosted fuel to a high pressure fuel supply pipe to which high pressure fuel to be supplied into the combustion chamber is supplied, by using a plurality of fuel supply units provided between the low pressure fuel supply pipe and the high pressure fuel supply pipe, each of the plurality of fuel supply units being provided with a reciprocating pump having a boosting piston configured to reciprocate in an axial direction thereof, the reciprocating pump being configured to suck the fuel when the boosting piston moves in a first direction in the axial direction and configured to boost and eject the fuel when the boosting piston moves in a second direction in the axial direction;

controlling the plurality of fuel supply units such that a reciprocating cycle time of the boosting piston is in common in the plurality of fuel supply units, and such that acceleration of the boosting piston in the second direction in one fuel supply unit is started when deceleration of the boosting piston in the second direction in at least one other fuel supply unit is started, and acceleration of the boosting piston in the second direction in one fuel supply unit is finished when deceleration of the boosting piston in the second direction in at least one other fuel supply unit is finished, in order to keep a total amount of ejection of the fuel ejected from the plurality of fuel supply units per unit time a constant value by decreasing an ejection amount of the fuel per unit time by decelerating a moving speed of the boosting piston in the second direction in the other fuel supply unit while an ejection amount of the fuel per unit time from the one fuel supply unit increases by accelerating a moving speed of the boosting piston in the second direction during one reciprocation movement of the boosting piston of the at least one fuel supply unit, and such that deceleration of the boosting piston in the second direction in the one fuel supply unit is started when acceleration of the boosting piston in the second direction in at least the one other fuel supply unit is started, and deceleration of the boosting piston in the second direction in the one fuel supply unit is finished when acceleration of the boosting piston in the second direction in at least one other fuel supply unit is finished, in order to keep a total amount of ejection of the fuel ejected from the plurality of fuel supply units per unit time a constant value by increasing an ejection amount of the fuel per unit time by accelerating a moving speed of the boosting piston in the second direction in the other fuel supply unit while an ejection amount of the fuel per unit time from the one fuel supply unit decreases by decelerating a moving speed of the boosting piston in the second direction during one reciprocation movement of the boosting piston in the one fuel supply unit.

According to the present technology, the pulsation of fuel pressure in a high pressure fuel supply pipe can be reduced.

BRIEF DESCRIPTION OF DRAWINGS

FIG. 6A is an example of a temporal change in the ejection amount of the fuel supply unit 20A. FIG. 6B is an example of a temporal change in the ejection amount of the fuel supply unit 20B. FIG. 6C is an example of a temporal change in the ejection amount of the fuel supply unit 20C. FIG. 6D is an example of a temporal change in the ejection amount of a fuel supply unit 20D. FIG. 6E is a diagram illustrating an example of a temporal change in the total amount of individual ejection amounts by the fuel supply units 20A, 20B, 20C and 20D in FIGS. 6A to 6D.

FIG. 7A is an example of a temporal change in the ejection amount of the fuel supply unit 20A. FIG. 7B is an example of a temporal change in the ejection amount of the fuel supply unit 20B. FIG. 7C is an example of a temporal change in the ejection amount of the fuel supply unit 20C. FIG. 7D is a diagram illustrating an example of a temporal change in the total amount of individual ejection amounts by the fuel supply units 20A, 20B, and 20C, in FIGS. 7A to 7C.

DETAILED DESCRIPTION

Hereinafter, a fuel supply device according to an embodiment of the present technology will be described with reference to the drawings.

Figure 1:
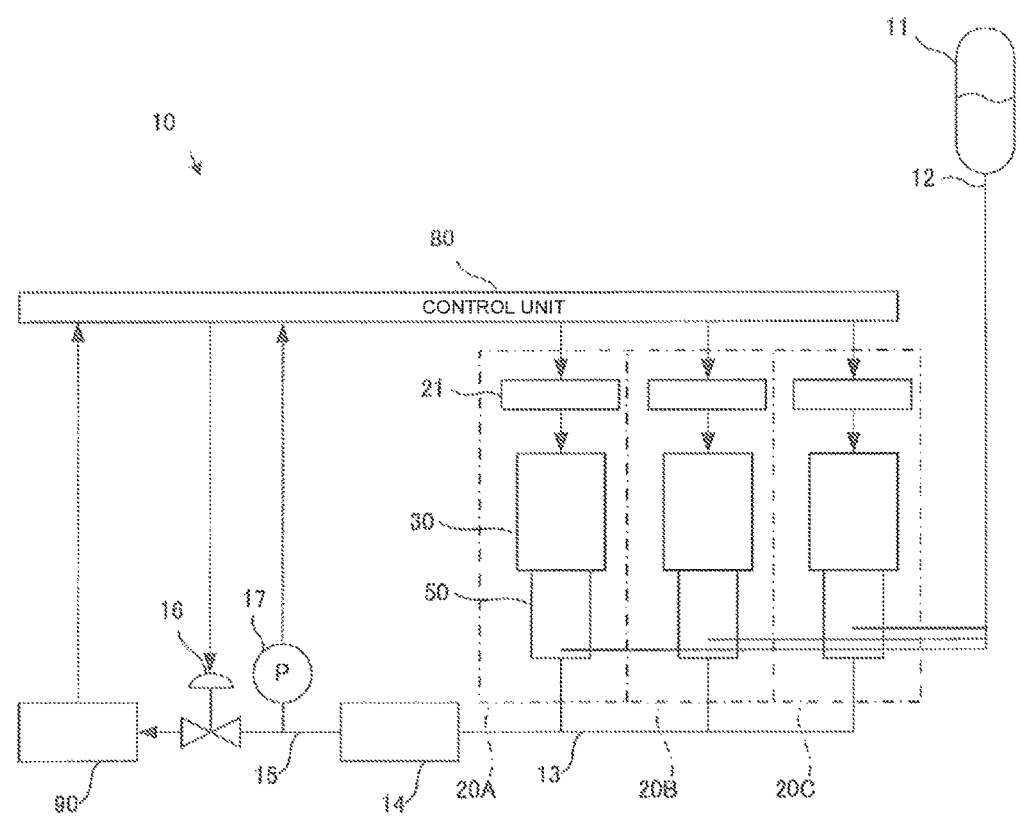
FIG. 1 is a schematic diagram of a configuration of a fuel supply device according to the present embodiment.

As illustrated in FIG. 1, a fuel supply device 10 of a present embodiment is a device that boosts and heats a liquid fuel and supply it into the combustion chamber of an internal combustion engine 90 by injecting the fuel at a high pressure. The internal combustion engine 90 is a prime mover that burns fuel in a combustion chamber in a cylinder and works with generated thermal energy, for example, a reciprocating engine, and a gas turbine. In particular, it is preferable to use as the internal combustion engine 90 a diesel engine that performs compression ignition of the fuel. The following embodiments describe a case where the internal combustion engine 90 is applied to a diesel engine mounted on a ship. Alternatively, the present technology can also be applied to a fuel supply device for a diesel engine other than a ship.

As illustrated in FIG. 1, the fuel supply device 10 includes a liquid fuel tank 11, a low pressure fuel supply pipe 12, a plurality of fuel supply units 20A, 20B, and 20C, a high pressure fuel supply pipe 13, a heat exchanger 14, a high temperature fuel supply pipe 15, a pressure regulating valve 16, a pressure gauge 17, and a control unit 80. All of these components of the fuel supply device 10 are mounted on a ship.

The liquid fuel tank 11 stores the fuel supplied to the internal combustion engine 90 in a liquid state. Examples of the liquid fuel stored in the liquid fuel tank 11 include liquefied methane, liquefied ethane, and liquefied propane. The liquid fuel tank 11 is connected to the low pressure fuel supply pipe 12 and supplies the liquid fuel to the fuel supply units 20A, 20B, and 20C via the low pressure fuel supply pipe 12.

The pressure of the liquid fuel in the low pressure fuel supply pipe 12 at a connecting portion with the fuel supply units 20A, 20B, and 20C is a pressure corresponding to the the height of the liquid surface of the liquid fuel in the liquid fuel tank 11. For the purpose of increasing this pressure to ensure a net positive suction head (NPSH), and to facilitate supply of liquid fuel to the fuel supply units 20A, 20B, and 20C, the liquid fuel tank 11 is arranged at a position higher than the fuel supply units 20A, 20B, and 20C.

Note that in a case where it is difficult to arrange the liquid fuel tank 11 at a high position, it is allowable to ensure the net positive suction head by increasing the pressure of the liquid fuel in the liquid fuel tank 11 using a booster pump for supplying the liquid fuel to the liquid fuel tank 11.

The fuel supply units 20A, 20B, and 20C are provided in parallel with each other at a position between the low pressure fuel supply pipe 12 and the high pressure fuel supply pipe 13.

Each of the fuel supply units 20A, 20B, and 20C includes a controller 21, a linear actuator 30, and a reciprocating pump 50.

The reciprocating pump 50 boosts the liquid fuel supplied from the low pressure fuel supply pipe 12 and supplies the boosted liquid fuel to the heat exchanger 14 via the high pressure fuel supply pipe 13. The low pressure fuel pipe 12 and the high pressure fuel supply pipe 13 are detachable from the fuel supply units 20A, 20B and 20C.

The linear actuator 30 drives the piston of the reciprocating pump 50. By using the linear actuator 30, it is possible to drive the piston of the reciprocating pump 50 at a lower speed than in the case of using the crankshaft, and possible to control the drive of the piston so as to move at a constant speed at piston strokes except for times of the start of the liquid inflow of the reciprocating pump, the start of liquid boosting, and the end of the liquid boosting. Examples of the applicable linear actuator 30 include a hydraulic cylinder unit and an electric cylinder unit. A present embodiment will describe a case where a hydraulic cylinder unit is used as the linear actuator 30.

Controlled by a control signal input from the control unit 80, the controller 21 controls the linear actuator 30. Moreover, a position signal indicating the position of the piston of the reciprocating pump 50 is input into the controller 21 as described below. The controller 21 controls the linear actuator 30 such that the ejection amount of the reciprocating pump 50 is adjusted in accordance with the position signal.

Note that while the three fuel supply units 20A, 20B, and 20C are provided in parallel with each other between the low pressure fuel supply pipe 12 and the high pressure fuel supply pipe 13 in FIG. 1, the number of fuel supply units is not limited to this but can be flexibly changed in accordance with the amount of fuel to be supplied.

The inlet side of the heat exchanger 14 is connected to the high pressure fuel supply pipe 13, and the outlet side thereof is connected to the high temperature fuel supply pipe 15. The heat exchanger 14 heats the boosted liquid fuel supplied via the high pressure fuel supply pipe 13. As the heat source for heating the liquid fuel, for example, the combustion heat of the boil-off gas generated in the liquid fuel tank 11 can be used. For example, it is allowable to heat the liquid fuel by heat exchange with warm water heated by the combustion heat of the boil-off gas.

The high temperature fuel supply pipe 15 includes a pressure regulating valve 16, and one end of the high temperature fuel supply pipe 15 is connected to the heat exchanger 14 and the other end is connected to the combustion chamber of the internal combustion engine 90. After the liquid fuel heated by the heat exchanger 14 is then regulated by the pressure regulating valve 16 to a pressure within a predetermined range needed by the internal combustion engine 90, and thereafter the liquid fuel is supplied to the combustion chamber of the internal combustion engine 90 via the high temperature fuel supply pipe 15. The pressure regulating valve 16 is controlled by the control unit 80.

Note that the pressure within the predetermined range needed by the internal combustion engine 90 varies depending on the type and performance of the internal combustion engine 90. In a case where the internal combustion engine 90 is a low speed two-stroke diesel engine for a ship, the pressure within a predetermined range is, for example, 5 MPa to 100 MPa, preferably 20 MPa to 70 MPa, although the present technology is not limited thereto.

Moreover, the high temperature fuel supply pipe 15 includes the pressure gauge 17. The pressure gauge 17 measures the pressure in the high temperature fuel supply pipe 15 and outputs the measurement signal to the control unit 80.

A signal indicating the load of the internal combustion engine 90 is input from the internal combustion engine 90 into the control unit 80. The signal indicating the load of the internal combustion engine 90 is, for example, a signal indicating the rotation speed.

The control unit 80 adjusts the ejection amount of the reciprocating pump 50 by outputting a control signal to the fuel supply units 20A, 20B, and 20C. The ejection amount of the reciprocating pump 50 is adjusted such that the pressure in the high temperature fuel supply pipe 15 becomes a pressure corresponding to necessary load of the internal combustion engine 90.

Note that it is allowable to measure the rotation speed of a propelling propeller (not illustrated) driven by the internal combustion engine 90 and adjust the pressure in the high temperature fuel supply pipe 15 in accordance with the rotation speed.

The liquid fuel tank 11, the low pressure fuel supply pipe 12, the linear actuator 30, the reciprocating pump 50, the high pressure fuel supply pipe 13, the heat exchanger 14, the high temperature fuel supply pipe 15, the pressure regulating valve 16, and the pressure gauge 17 are arranged at hazardous areas. In contrast, the controller 21 and the control unit 80 are generally non-explosion-proof products. In a case where they are not explosion-proof, they should be arranged in a non-hazardous area separated from the hazardous areas by explosion-proof walls, or should be arranged in a non-explosion-proof area sufficiently away from the hazardous areas.

Next, with reference to FIGS. 2 and 3, a specific configuration of the linear actuator 30 and the reciprocating pump 50 using a servo motor as the electric motor will be described in detail. While the following description is a case where a hydraulic cylinder unit is used as the linear actuator 30, the linear actuator 30 is not limited to a hydraulic cylinder unit.

Figure 2:
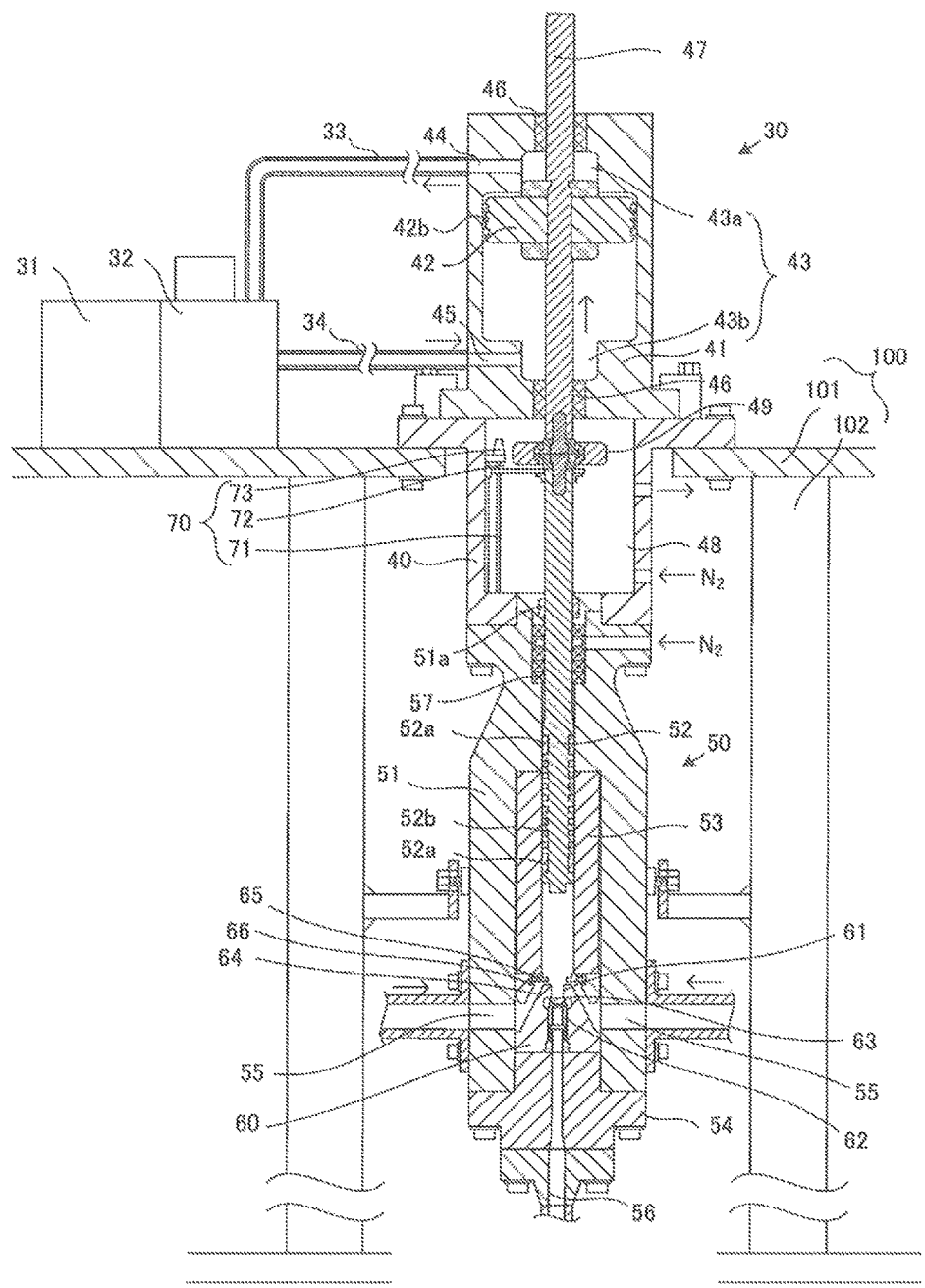
FIG. 2 is a cross-sectional view of a linear actuator 30 and a reciprocating pump 50 at the time of fuel suction.
Figure 3:
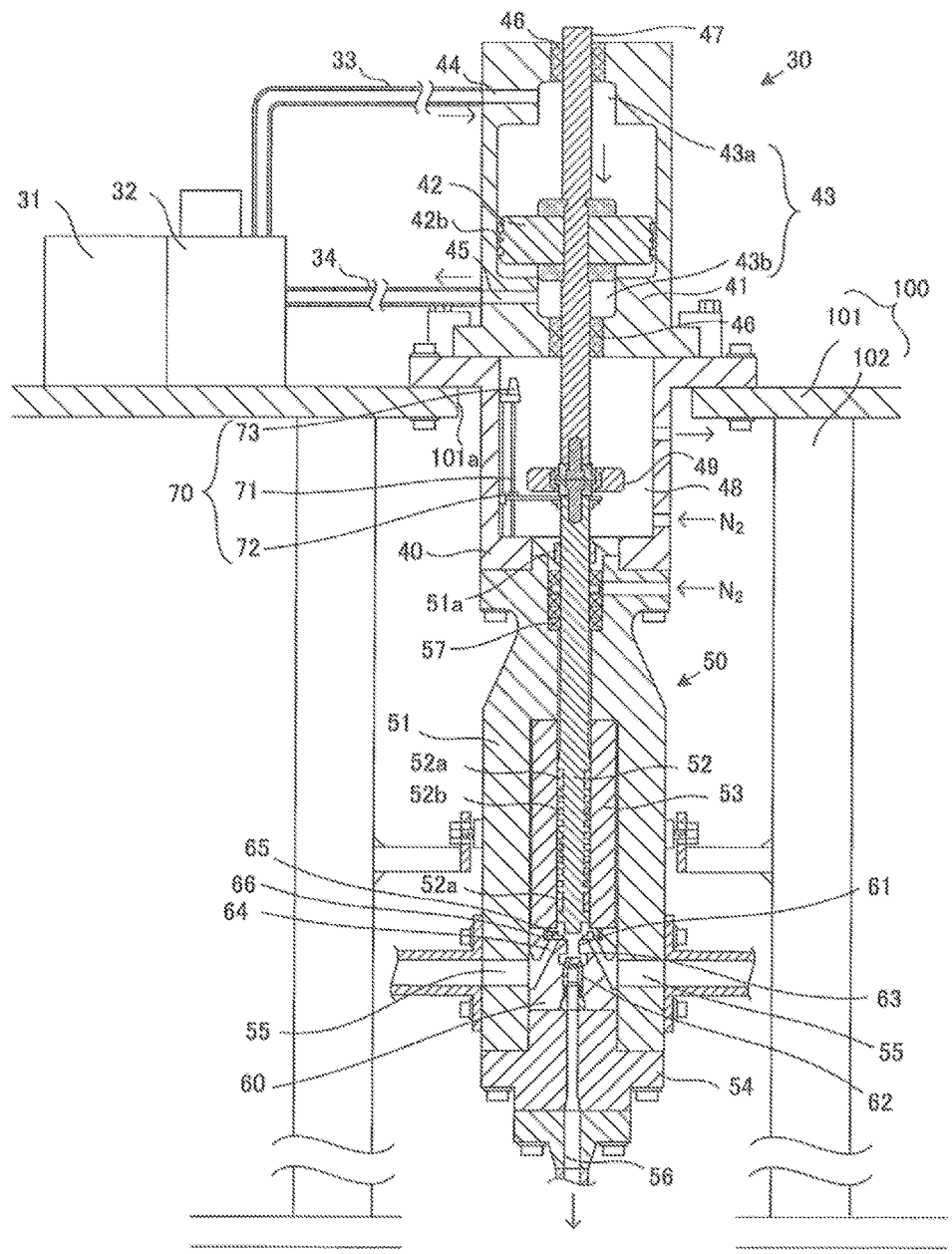
FIG. 3 is a cross-sectional view of the linear actuator 30 and the reciprocating pump 50 at the time of ejecting fuel.

In FIGS. 2 and 3, the up-down direction corresponds to the vertical direction, and the left-right direction corresponds to the horizontal direction. In the following description, the upward direction in the vertical direction will be referred to as "upper" (or "above"), a portion in the upper direction as "upper portion", the lower direction in the vertical direction as "lower" (or "below"), and a portion in the lower direction as "lower portion". The following will describe the linear actuator 30 and the reciprocating pump 50 arranged so as to allow the axial direction to be aligned with the vertical direction. The present technology, however, is not limited to this, and it is allowable to use the linear actuator 30 and the reciprocating pump 50 arranged such that the axial direction comes in the horizontal direction or in an angled direction.

In the present embodiment, the linear actuator 30 and the reciprocating pump 50 are arranged with the axial direction oriented in the vertical direction. Note that while FIGS. 2 and 3 illustrate an example in which the reciprocating pump 50 is arranged below the linear actuator 30, the reciprocating pump 50 may be arranged above the linear actuator 30.

[Hydraulic Cylinder Unit]

As illustrated in FIGS. 2 and 3, the hydraulic cylinder unit (linear actuator 30) includes an electric motor 31, a hydraulic pump 32, a first hydraulic pipe 33, a second hydraulic pipe 34, a fixed portion 40, a hydraulic cylinder 41, and a hydraulic piston 42.

The hydraulic cylinder unit is provided on a top plate 101 of a cradle 100. The top plate 101 is supported by a leg 102, and the leg 102 is fixed to a structure such as a deck or an inner bottom plate of the hull.

The electric motor 31 is provided at an upper portion of the top plate 101. The electric motor 31 is controlled by the controller 21 and drives the hydraulic pump 32. An inverter motor or a servo motor is used as the electric motor 31, for example.

The hydraulic pump 32 is provided at an upper portion of the top plate 101. The hydraulic pump 32 is driven by the electric motor 31, and supplies hydraulic fluid into the hydraulic cylinder 41, thereby moving the hydraulic piston 42 in the vertical direction. Examples of the applicable hydraulic fluid include petroleum-based hydraulic oil, synthetic hydraulic fluid, and water-formed hydraulic fluid.

The hydraulic pump 32 is connected with the first hydraulic pipe 33 and the second hydraulic pipe 34. The hydraulic pump 32 is driven by the electric motor 31.

In a case where the electric motor 31 is a servo motor, the direction in which the hydraulic fluid is ejected from the hydraulic pump 32 is switched in accordance with the forward-reverse rotational directions of the electric motor 31. For example, during forward rotation of the electric motor 31, the hydraulic pump 32 sucks the hydraulic fluid in the first hydraulic pipe 33 and ejects the sucked hydraulic fluid to the second hydraulic pipe 34. Moreover, during reverse rotation of the electric motor 31, the hydraulic pump 32 sucks the hydraulic fluid in the second hydraulic pipe 34 and ejects the sucked hydraulic fluid to the first hydraulic pipe 33. In this case, the direction switching valve is unnecessary for the first hydraulic pipe 33 and the second hydraulic pipe 34.

In contrast, in a case where the electric motor 31 is an inverter motor, the direction in which the hydraulic fluid flows is changed by a direction switching valve (not illustrated) provided in the first hydraulic pipe 33 and the second hydraulic pipe 34.

Note that the flow rate and pressure of the hydraulic fluid in the first hydraulic pipe 33 and the second hydraulic pipe 34 are determined by the ejection amount of the hydraulic pump 32. In any case where the electric motor 31 is a servo motor and the electric motor 31 is an inverter motor, the flow rate and pressure of the hydraulic fluid can be adjusted by the rotation speed of the electric motor 31.

The fixed portion 40 is fixed to the top plate 101, arranged in the opening 101a provided on the top plate 101. The hydraulic cylinder 41 is fixed at an upper portion of the fixed portion 40, and the reciprocating pump 50 is fixed to the lower portion of the fixed portion 40. The fixed portion 40 is hollow cylinder and internally includes a cavity 48.

The hydraulic cylinder 41 includes a hydraulic fluid accommodation space 43 for accommodating hydraulic fluid and is mounted on the top surface of the top plate 101 such that the axial direction comes in the vertical direction. Moreover, a side wall of the hydraulic cylinder 41 includes an upper through hole 44 communicating with the upper end portion of the hydraulic fluid accommodation space 43 and a lower through hole 45 communicating with the lower end portion of the hydraulic fluid accommodation space 43. An outer opening portion of the upper through hole 44 is connected to the first hydraulic pipe 33, and an outer opening portion of the lower through hole 45 is connected to the second hydraulic pipe 34.

The hydraulic piston 42 includes a piston ring 42b. The hydraulic piston 42 includes a rider ring 42a vertically movably accommodated in the hydraulic fluid accommodation space 43 while allowing the piston ring 42b to be in contact with the inner wall surface of the hydraulic fluid accommodation space 43 of the hydraulic cylinder 41. The rider ring 51a has a function of correcting deflection in the horizontal direction when the hydraulic piston 42 moves in the vertical direction. The piston ring 42b has a function of closing a gap between the hydraulic piston 42 and the inner wall surface of the hydraulic fluid accommodation space 43.

The hydraulic piston 42 partitions the hydraulic fluid accommodation space 43 into an upper chamber 43a above the hydraulic piston 42 and a lower chamber 43b below the hydraulic piston 42.

The hydraulic piston 42 is of a double rod type and includes a piston rod 47 protruding to the outside from the upper portion and the lower portion of the hydraulic cylinder 41. The piston rod 47 moves up and down together with the hydraulic piston 42. Since the hydraulic piston 42 is a double rod type, the decrease amount in the volume of the upper chamber 43a when the hydraulic piston 42 moves upward is equal to the increase amount in the volume of the lower chamber 43b. The hydraulic piston 42 may be a single rod type. In this case, however, it is desirable to provide a pulsation prevention tank because pressure fluctuation occurs due to a change in the amount of hydraulic fluid that moves.

A bush 46 is provided at a portion of the hydraulic cylinder 41 through which the piston rod 47 passes. An oil seal is incorporated in the bush 46. The bush 46 supports the piston rod 47 such that it can move up and down, and prevents the hydraulic fluid from leaking out of the hydraulic fluid accommodation space 43.

The cavity 48 includes a coupling portion 49 connecting the lower end portion of the piston rod 47 with the upper end portion of the boosting piston 52 of the reciprocating pump 50. The coupling portion 49 moves up and down within the cavity 48 together with the up-down motion of the piston rod 47. Note that the coupling portion 49 has a function of adjusting the axial misalignment of the piston rod 47 of the hydraulic cylinder with the piston 52 of the reciprocating pump 50.

From the viewpoint of preventing gas leakage from the reciprocating pump, nitrogen gas at room temperature is externally supplied to the cavity 48. The nitrogen gas may be supplied to a rod packing portion 57 of the reciprocating pump 50. With the cavity 48, it is possible to suppress heat conduction to the low temperature heat source (liquid fuel) in the reciprocating pump 50 and to prevent the high temperature heat source (hydraulic fluid) in the hydraulic fluid accommodation space 43 from being cooled via the piston rod 47. Note that it is allowable to prevent the high temperature heat source from being cooled by installing an explosion-proof heater or an endothermic fin.

[Reciprocating Pump]

As the reciprocating pump 50, it is possible to use, for example, a reciprocating pump having a structure similar to that described in JP 5519857 B.

More specifically, the reciprocating pump 50 includes a boosting cylinder 51, the boosting piston 52, a cylinder liner 53, a cover 54, and a valve box 60.

The upper end portion of the boosting cylinder 51 is fixed to the lower end portion of the fixed portion 40. The side wall of the boosting cylinder 51 is fixed to the leg 102 of the cradle 100. The rod packing portion 57 is provided on an upper-side portion of the boosting cylinder 51.

The boosting cylinder 51 has an internal space for accommodating the boosting piston 52, the cylinder liner 53, and the valve box 60. The cover 54 is fixed to the lower end portion of the boosting cylinder 51. The cylinder liner 53 and the valve box 60 are fixed within the boosting cylinder 51 by the cover 54.

A suction port 55 is provided on the side wall of the boosting cylinder 51 at a height position at which the valve box 60 is fixed inside. The suction port 55 is connected with the low pressure fuel supply pipe 12.

The cover 54 includes an ejection port 56 penetrating in the vertical direction. The ejection port 56 is connected with the high pressure fuel supply pipe 13.

Note that the valve box 60 is provided below the boosting piston 52, and fuel is sucked into the lower portion of the boosting piston 52 inside the boosting cylinder 51 when the boosting piston 52 is moved vertically upward. With this configuration, it is possible to arrange the suction port 55 of the reciprocating pump 50 at a lower position. The pressure of the liquid fuel in the low pressure fuel supply pipe 12 at the connecting portion with the suction port 55 is a pressure proportional to the difference between the height of the liquid surface of the liquid fuel in the liquid fuel tank 11 and the height of the suction port 55. Accordingly, by arranging the suction port 55 at a lower position, it is possible to increase the pressure of the liquid fuel in the low pressure fuel supply pipe 12 at the connecting portion with the suction port 55. This facilitates supply of the fuel from the suction port 55 into the boosting cylinder 51.

The upper end portion of the boosting piston 52 is coupled to the lower end portion of the piston rod 47 by the coupling portion 49, and the boosting piston 52 moves up and down in conjunction with the piston rod 47.

Moreover, a position sensor is provided at the upper end portion of the boosting piston 52. The position sensor detects the position of the boosting piston 52 in the vertical direction and outputs the position signal to the controller 21. Note that the speed of the boosting piston 52 can be obtained by time-differentiating the displacement of the boosting piston 52 using the position signal. That is, the position sensor can also be used as a speed sensor.

Note that the position sensor may be attached to the hydraulic cylinder 41.

As the position sensor, for example, a magnetostrictive position sensor 70 or an ultrasonic sensor can be used. Herein, a case of using the magnetostrictive position sensor will be described.

More specifically, the magnetostrictive position sensor 70 includes a sensor probe 71 (magnetostrictive line), an annular magnet 72, and a detector 73. The sensor probe 71 is provided in the cavity 48 in the vertical direction. The annular magnet 72 is attached to the upper end portion of the boosting piston 52 so as to move up and down together with the boosting piston 52 along the sensor probe 71, which is inserted in the center of the annular magnet 72. The detector 73 for detecting distortion generated in the sensor probe 71 is provided at one end of the sensor probe 71. When a current pulse signal is given to the sensor probe 71, a magnetic field in the circumferential direction centered on the sensor probe 71 is generated. At the position of the sensor probe 71 that is at the same height as the magnet 72, a magnetic field is applied in the axial direction of the sensor probe 71, leading to generation of a combined magnetic field inclined to the axial direction. This field means local torsional distortion in the sensor probe 71. The detector 73 detects the position of the magnet 72 in the height direction by detecting the torsional distortion, and outputs to the controller 21, a position signal indicating the position of the boosting piston 52 in the height direction.

A rider ring 52a and a piston ring 52b are provided at a lower portion of the boosting piston 52. The boosting piston 52 is accommodated in the cylinder liner 53 so as to be movable in the vertical direction while allowing the rider ring 52a and the piston ring 52b to be in contact with the inner wall surface of the cylinder liner 53. The rod packing portion 57 is also equipped with the rider ring 51a. Each of these rider rings 51a, and 52a has a function of correcting deflection in the horizontal direction when the boosting piston 52 moves in the vertical direction. The piston ring 52b closes a gap between the boosting piston 52 and the inner wall surface of the cylinder liner 53 and seals the pressure of the boosted liquid fuel at the leading end.

The valve box 60 is fixed to the lower portion of the cylinder liner 53 in the boosting cylinder 51. The valve box 60 includes an ejection flow path 61, an ejection valve body 62, a suction flow path 64, and a suction valve body 65.

The ejection flow path 61 is provided so as to penetrate the valve box 60 in the vertical direction. In the ejection flow path 61, the ejection valve body 62 is accommodated movably in the vertical direction. The upper end portion side of the ejection flow path 61 is a small diameter portion whose inner diameter is smaller than the outer diameter of the ejection valve body 62. At the lower opening of the small diameter portion, a valve seat 63 is formed where the ejection valve body 62 is arranged. The ejection valve body 62 and the valve seat 63 constitute an ejection valve.

An opening on the lower side of the valve box 60 of the ejection flow path 61 is provided at a position opposing the ejection port 56 of the cover 54.

The suction flow path 64 is provided at a position communicating with the position of the boosting piston 52 from the outer wall of the valve box 60. The position of the suction flow path 64 is on the upper surface of the valve box 60. An opening on the outer wall side of the valve box 60 of the suction flow path 64 is provided at a position opposing the suction port 55 of the boosting cylinder 51.

At an outer peripheral portion of the opening on the upper surface side of the valve box 60 of the suction flow path 64, a valve seat 66 is formed for the suction valve body 65, and the suction valve body 65 is movably arranged in the vertical direction above the valve seat 66. The suction valve body 65 and the valve seat 66 constitute a suction valve.

The rod packing portion 57 is connected to the cavity 48 and is sealed with a seal ring so as not to allow the gas generated from vaporized liquid fuel to leak to the outside air. The liquid fuel that leaks without being sealed by the piston ring 52b is vaporized under a low pressure and is sealed by the rod packing portion 57. In order to prevent leakage of the gas vaporized from the liquid fuel to the outside, it is allowable to supply nitrogen gas to the rod packing portion 57 instead of supplying the gas to the cavity 48.

[Operation of Linear Actuator and Reciprocating Pump]

Next, operation of the linear actuator 30 and the reciprocating pump 50 using the servo motor as the electric motor will be described.

First, the hydraulic pump 32 is driven by the electric motor 31. Subsequently, as illustrated in FIG. 2, the hydraulic fluid in the upper chamber 43a is discharged from the upper through hole 44, passes through the first hydraulic pipe 33 and the second hydraulic pipe 34 and supplied to the lower chamber 43b via the lower through hole 45. Then, the hydraulic piston 42 moves upward in the hydraulic fluid accommodation space 43 such that the volume of the lower chamber 43b increases and the volume of the upper chamber 43a decreases. Note that there is no branch, or the like, in the first hydraulic pipe 33 and the second hydraulic pipe, and thus, all of the hydraulic fluid flowing out from the upper chamber 43a is directed toward the lower chamber 43b for supply.

When the hydraulic piston 42 moves upward, the boosting piston 52 coupled to the lower end portion of the piston rod 47 at the coupling portion 49 rises (moves in a first direction) in the cylinder liner 53. This causes the suction valve body 65 to move upward away from the valve seat 66, and the liquid fuel supplied from the suction port 55 passes through the suction flow path 64 and flows into the space inside the cylinder liner 53 at a lower portion of the boosting piston 52. At this time, the ejection valve body 62 is in a state of closing the opening of the valve seat 63.

Next, the controller 21 switches the rotational direction of the electric motor 31 to drive the hydraulic pump 32 in a direction opposite to that in FIG. 2, and as illustrated in FIG. 3, the hydraulic fluid in the lower chamber 43b is caused to be discharged from the lower through hole 45 and passes through the second hydraulic pipe 34 and the first hydraulic pipe 33 to be supplied to the upper chamber 43a from the upper through hole 44. Then, the hydraulic piston 42 moves downward in the hydraulic fluid accommodation space 43 such that the volume of the lower chamber 43b decreases and the volume of the upper chamber 43a increases. Note that there is no branch, or the like, in the first hydraulic pipe 33 and the second hydraulic pipe, and thus, all of the hydraulic fluid flowing out from the lower chamber 43b is directed toward the upper chamber 43a for supply.

When the hydraulic piston 42 moves downward, the boosting piston 52 coupled to the lower end portion of the piston rod 47 at the coupling portion 49 moves downward (moves in a second direction) within the cylinder liner 53. This causes the liquid fuel sucked into the space at a lower portion of the boosting piston 52 inside the cylinder liner 53 to push down the ejection valve body 62 to be separated from the valve seat 63, and the liquid fuel is discharged from the ejection port 56 through the suction flow path 64. At this time, the suction valve body 65 is in a state of closing the opening of the valve seat 66.

In this manner, by switching the rotation direction of the electric motor 31 and switching the driving direction of the hydraulic pump 32, it is possible to allow the hydraulic fluid to be alternately brought back and forth between the upper chamber 43a and the lower chamber 43b, and to cause the hydraulic piston 42 and the boosting piston 52 to reciprocate in the vertical direction, and to boost the liquid fuel sucked through the suction port 55 to be ejected from the ejection port 56.

Note that in the case of the linear actuator 30 using the inverter motor for the electric motor, by switching the flow direction of the hydraulic fluid by using the direction switching valve, it is possible to allow the hydraulic fluid to be alternately brought back and forth between the upper chamber 43a and the lower chamber 43b, to allow the hydraulic piston 42 and the boosting piston 52 to reciprocate in the vertical direction, and to boost the liquid fuel sucked from the suction port 55 to be ejected from the ejection port 56.

In the present embodiment, it is preferable that the control unit 80 controls the controller 21 of each of the fuel supply units 20A, 20B, and 20C such that the total sum of the ejection amounts of the fuel ejected from the boosting cylinder 51 of each of the fuel supply units 20A, 20B, and 20C becomes constant.

Specifically, it is sufficient that the control unit 90 controls the plurality of fuel supply units 20A, 20B, and 20C such that when the ejection amount of fuel from at least one of the fuel supply units 20A, 20B, and 20C increases, the ejection amount of fuel from the other fuel supply section units decreases.

For example, it is sufficient that the control unit 90 controls the plurality of fuel supply units 20A, 20B, and 20C such that the total sum of the increase amount of the fuel ejection from the fuel supply unit or the fuel supply units in which the fuel ejection amount is increasing among the plurality of fuel supply units 20A, 20B, and 20C becomes equal to the total sum of the decrease amount of the fuel ejection amounts from the other fuel supply units.

The ejection amount of each of the fuel supply units 20A, 20B, and 20C is a product of the cross-sectional area and the speed of the boosting piston 52. Therefore, by adjusting the speed of the boosting piston 52, that is, by adjusting the fluid pressure by adjusting the fluid amount flowing into the hydraulic cylinder 41, it is possible to adjust the ejection amount of each of the fuel supply units 20A, 20B, and 20C. The speed of the boosting piston 52 is adjusted by the actuator 30 controlled by controller 21.

Figure 4A:
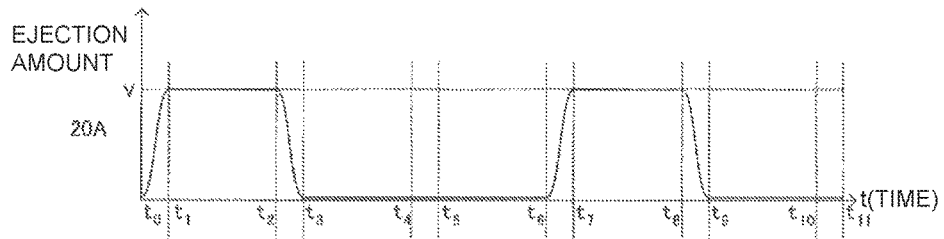
FIG. 4A is an example of a temporal change in the ejection amount of a fuel supply unit 20A.
Figure 4B:
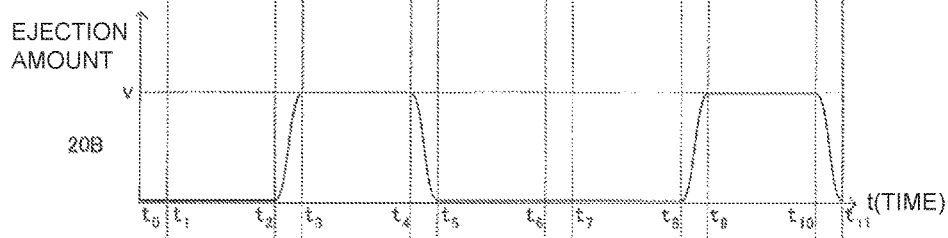
FIG. 4B is an example of a temporal change in the ejection amount of a fuel supply unit 20B.
Figure 4C:
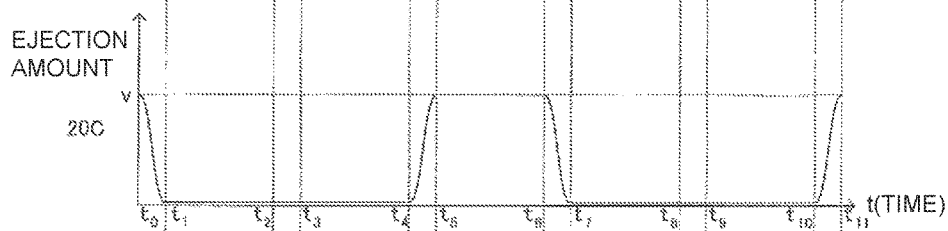
FIG. 4C is an example of a temporal change in the ejection amount of a fuel supply unit 20C.
Figure 4D:
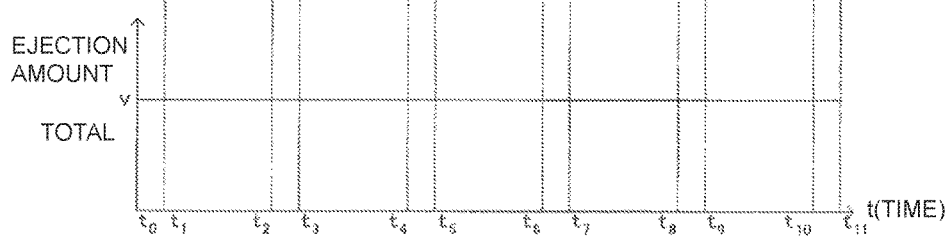
FIG. 4D is a diagram illustrating an example of a temporal change in total amount of individual ejection amounts by the fuel supply units 20A, 20B, and 20C.

FIG. 4A is a diagram illustrating an example of a temporal change in the ejection amount of the fuel supply unit 20A. FIG. 4B is a diagram illustrating an example of a temporal change in the ejection amount of the fuel supply unit 20B. FIG. 4C is a diagram illustrating an example of a temporal change in the ejection amount of the fuel supply unit 20C. FIG. 4D is a diagram illustrating an example of a temporal change in the total amount of individual ejection amounts by the fuel supply units 20A, 20B, and 20C, in FIGS. 4A to 4C. Note that each of the boosting pistons of the fuel supply units 20A, 20B, and 20C reciprocates in a common cycle time.

As illustrated in FIG. 4A, at time t0, acceleration of the boosting piston 52 in the fuel supply unit 20A in the second direction is started, and at the same time, deceleration of the boosting piston 52 in the fuel supply unit 20C in the second direction is started.

From time t0 to time t1, the ejection amount of the fuel supply unit 20A per unit time increases as illustrated in FIG. 4A, and at the same time, the ejection amount of the fuel supply unit 20C per unit time decreases as illustrated in FIG. 4C. As illustrated in FIG. 4B, the ejection amount of the fuel supply unit 20B is zero. At this time, since the increase amount of the ejection amount of the fuel supply unit 20A is equal to the decrease amount of the ejection amount of the fuel supply unit 20C, the total ejection amount per unit time is kept constant as illustrated in FIG. 4D.

At time t1, acceleration of the boosting piston 52 in the second direction is finished in the fuel supply unit 20A, and at the same time, deceleration of the boosting piston 52 in the second direction is finished in the fuel supply unit 20C.

From time t1 to time t2, since the ejection amount of the fuel supply unit 20A per unit time is kept constant and the ejection amount of the other fuel supply units 20B and 20C per unit time are zero, the total ejection amount per unit time is kept constant as illustrated in FIG. 4D.

At time t2, at the fuel supply unit 20A, the deceleration of the boosting piston 52 in the second direction is started, and at the same time, the acceleration of the boosting piston 52 in the second direction is started in the fuel supply unit 20B.

From time t2 to time t3, the ejection amount of the fuel supply unit 20B per unit time increases as illustrated in FIG. 4B, and at the same time, the ejection amount of the fuel supply unit 20A per unit time decreases as illustrated in FIG. 4A. As illustrated in FIG. 4C, the ejection amount of the fuel supply unit 20C per unit time is zero. At this time, since the increase amount of the ejection amount of the fuel supply unit 20B per unit time is equal to the decrease amount of the ejection amount of the fuel supply unit 20A per unit time, the total ejection amounts is kept constant as illustrated in FIG. 4D.

At time t3, at the fuel supply unit 20A, the deceleration of the boosting piston 52 in the second direction is finished, and at the same time, the acceleration of the boosting piston 52 in the second direction is finished in the fuel supply unit 20B.

From time t3 to time t4, since the ejection amount of the fuel supply unit 20B per unit time is kept constant and the ejection amount of the other fuel supply units 20A and 20C per unit time are zero, the total ejection amount per unit time is kept constant as illustrated in FIG. 4D.

From time t4 to time t5, the ejection amount of the fuel supply unit 20C per unit time increases as illustrated in FIG. 4C, and at the same time, the ejection amount of the fuel supply unit 20B per unit time decreases as illustrated in FIG. 4B. As illustrated in FIG. 4A, the ejection amount of the fuel supply unit 20A per unit time is zero. At this time, since the increase amount of the ejection amount of the fuel supply unit 20C per unit time is equal to the decrease amount of the ejection amount of the fuel supply unit 20B per unit time, the total ejection amounts is kept constant as illustrated in FIG. 4D.

From time t5 to time t6, since the ejection amount of the fuel supply unit 20C per unit time is kept constant and the ejection amount of the other fuel supply units 20A and 20B per unit time is zero, the total ejection amount per unit time is kept constant as illustrated in FIG. 4D.

In this manner, the control unit 80 controls the controller 21 of each of the fuel supply units 20A, 20B, and 20C such that the total sum of the ejection amounts of the fuel ejected from the boosting cylinder 51 of each of the fuel supply units 20A, 20B, and 20C per unit time is kept constant, making it possible to prevent generation of pulsation in high pressure fuel supply pipe 13. Note that when the maximum value of the ejection amounts of the fuel supply units 20A, 20B, and 20C is v, the total ejection amount per unit time is kept constant at v.

Herein, the stroke is a height from a lowermost point to an uppermost point at the time of reciprocation of the boosting piston 52 in the up-down direction. The stroke is set from the lowermost position of the boosting piston 52 in the cylinder liner 53. The lowermost position of the boosting piston 52 is a position where the volume of the space inside the cylinder liner 53 below the boosting piston 52 is minimized. By adjusting the stroke on the basis of this position, all the liquid fuel in the reciprocating pump 50 is ejected in individual cycles regardless of the setting of the stroke.

Note that while FIG. 4 illustrates the time intervals between t(n−1) and to (n is a natural number) as equal intervals, the time intervals can be appropriately changed. For example, the time interval between t1 and t2 may be increased by decreasing the ejection amount per time, that is, the speed of the boosting piston 52. Since the linear actuator 30 is used to drive the reciprocating pump 50, the stroke of the boosting piston 52 can be freely adjusted.

Note that the controller 21 may control the driving of the linear actuator 30 such that the descending speed of the boosting piston 52 (speed of moving in the second direction) is kept constant so as to allow the ejection amount of the reciprocating pump 50 to be constant.

Note that since the plurality of fuel supply units 20A, 20B, and 20C can be controlled independently, the number of fuel supply units operating in accordance with the fuel demand of the internal combustion engine 90 can also be changed. For example, it is allowable to configure so as to cause solely the fuel supply units 20A and 20B to operate and cause the fuel supply unit 20C to stop.

Figure 5A:
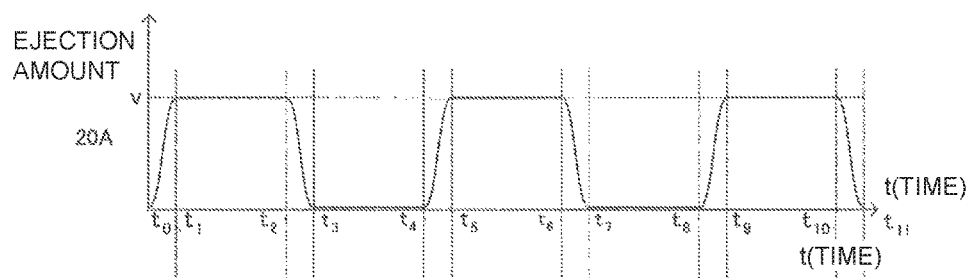
FIG. 5A is an example of a temporal change in the ejection amount of the fuel supply unit 20A.
Figure 5B:
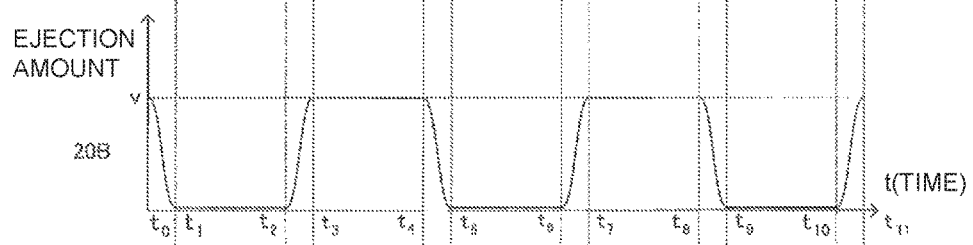
FIG. 5B is an example of a temporal change in the ejection amount of the fuel supply unit 20B.
Figure 5C:
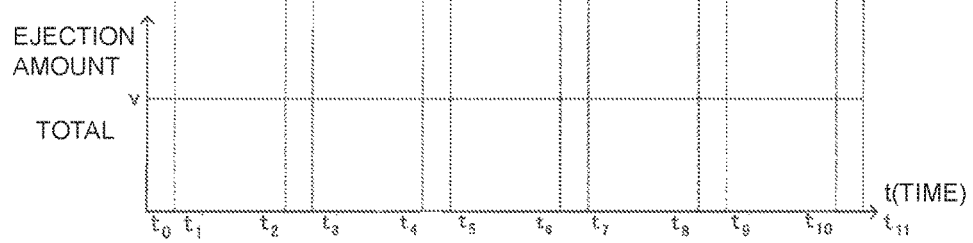
FIG. 5C is a diagram illustrating an example of a temporal change in the total amount of individual ejection amounts by the fuel supply units 20A and 20B in FIGS. 5A and 5B.

FIGS. 5A to 5C are diagrams illustrating examples of temporal changes in the ejection amount in a case where fuel is supplied solely by the fuel supply units 20A and 20B. FIG. 5A is a diagram illustrating an example of a temporal change in the ejection amount of the fuel supply unit 20A. FIG. 5B is a diagram illustrating an example of a temporal change in the ejection amount of the fuel supply unit 20B. FIG. 5C is a diagram illustrating an example of a temporal change in the total of individual ejection amounts by the fuel supply units 20A and 20B in FIGS. 5A and 5B.

From time t0 to time t1, the ejection amount of the fuel supply unit 20A increases as illustrated in FIG. 5A, and at the same time, the ejection amount of the fuel supply unit 20B decreases as illustrated in FIG. 5B. At this time, since the increase amount of the ejection amount of the fuel supply unit 20A is equal to the decrease amount of the ejection amount of the fuel supply unit 20B, the total ejection amount is kept constant as illustrated in FIG. 5C.

From time t1 to time t2, since the ejection amount of the fuel supply unit 20A is kept constant and the ejection amount of the fuel supply unit 20B is zero, the total ejection amount is kept constant as illustrated in FIG. 5C.

From time t2 to time t3, the ejection amount of the fuel supply unit 20B increases as illustrated in FIG. 5B, and at the same time, the ejection amount of the fuel supply unit 20A decreases as illustrated in FIG. 5A. At this time, since the increase amount of the ejection amount of the fuel supply unit 20B is equal to the decrease amount of the ejection amount of the fuel supply unit 20A, the total ejection amount is kept constant as illustrated in FIG. 5C.

From time t3 to t4, since the ejection amount of the fuel supply unit 20B is kept constant and the ejection amount of the fuel supply unit 20A is zero, the total ejection amount is kept constant as illustrated in FIG. 5C.

In this manner, the total ejection amount can be made constant by shifting ejection timings of the fuel supply units 20A and 20B from each other.

Moreover, in addition to the three fuel supply units 20A, 20B, and 20C, a fourth fuel supply unit (referred to as 20D) may be used.

FIGS. 6A to 6E are diagrams illustrating examples of temporal changes in the ejection amount in a case where fuel is supplied by the four fuel supply units 20A, 20B, 20C, and 20D. FIG. 6A is a diagram illustrating an example of a temporal change in the ejection amount of the fuel supply unit 20A. FIG. 6B is a diagram illustrating an example of a temporal change in the ejection amount of the fuel supply unit 20B. FIG. 6C is a diagram illustrating an example of a temporal change in the ejection amount of the fuel supply unit 20C. FIG. 6D is a diagram illustrating an example of a temporal change in the ejection amount of the fuel supply unit 20D. FIG. 6E is a diagram illustrating an example of a temporal change in the total amount of individual ejection amounts by the fuel supply units 20A, 20B, 20C, and 20D in FIGS. 6A to 6D.

From time t0 to time t1, the ejection amount of each of the fuel supply units 20A and 20C increases as illustrated in FIGS. 6A and 6C, and at the same time, the ejection amount of each of the fuel supply units 20B and 20D decreases as illustrated in FIGS. 6B and 6D. At this time, since the sum of the increase amounts of the ejection amounts of the fuel supply units 20A and 20C is equal to the sum of the decrease amounts of the ejection amounts of the fuel supply units 20B and 20D, the total ejection amount is kept constant as illustrated in FIG. 6E.

From time t1 to time t2, since the ejection amounts of the fuel supply units 20A and 20C are kept constant and the ejection amounts of the fuel supply units 20B and 20D are zero, the total ejection amount is kept constant as illustrated in FIG. 6E.

From time t2 to time t3, the ejection amount of each of the fuel supply units 20B and 20D increases as illustrated in FIGS. 6B and 6D, and at the same time, the ejection amount of each of the fuel supply units 20A and 20C decreases as illustrated in FIGS. 6A and 6C. At this time, since the sum of the increase amounts of the ejection amounts of the fuel supply units 20B and 20D is equal to the sum of the decrease amounts of the ejection amounts of the fuel supply units 20A and 20C, the total ejection amount is kept constant as illustrated in FIG. 6E.

From time t3 to t4, since the ejection amounts of the fuel supply units 20B and 20D are kept constant and the ejection amounts of the fuel supply units 20A and 20C are zero, the total ejection amount is kept constant as illustrated in FIG. 6E.

In this manner, the total ejection amount can be made constant by shifting ejection timings of the fuel supply units 20A/20C and the fuel supply units 20B/20D from each other.

Note that the maximum ejection amounts of the plurality of fuel supply units 20A, 20B, and 20C may be mutually different.

FIG. 7A is a diagram illustrating an example of a temporal change in the ejection amount of the fuel supply unit 20A. FIG. 7B is a diagram illustrating an example of a temporal change in the ejection amount of the fuel supply unit 20B. FIG. 7C is a diagram illustrating an example of a temporal change in the ejection amount of the fuel supply unit 20C. FIG. 7D is a diagram illustrating an example of a temporal change in the total amount of individual ejection amounts by the fuel supply units 20A, 20B, and 20C, in FIGS. 7A to 7C. Herein, the speed of the boosting piston 52 is adjusted such that, when the maximum ejection amount of the fuel supply unit 20B is v1 and the maximum ejection amount of the fuel supply unit 20C is v2, the maximum ejection amount of the fuel supply unit 20A is v1+v2 and the total of the individual ejection amounts of the fuel supply units 20A, 20B, and 20C becomes v1+v2, at the same time. Note that v1 and v2 may be mutually different or may be identical.

From time t0 to time t1, the ejection amount of the fuel supply units 20A increases as illustrated in FIG. 7A, and at the same time, the ejection amount of each of the fuel supply units 20B and 20C decreases as illustrated in FIGS. 7B and 7C. At this time, since the increase amount of the ejection amount of the fuel supply unit 20A is equal to the sum of the decrease amounts of the ejection amounts of the fuel supply units 20B and 20C, the total ejection amount is kept constant as illustrated in FIG. 7D.

From time t1 to t2, since the ejection amount of the fuel supply unit 20A is kept constant (v1+v2) and the ejection amounts of the fuel supply units 20B and 20C are zero, the total ejection amount is kept constant (v1+v2) as illustrated in FIG. 7D.

From time t2 to time t3, the ejection amount of each of the fuel supply units 20B and 20C increases as illustrated in FIGS. 7B and 7C, and at the same time, the ejection amount of the fuel supply unit 20A decreases as illustrated in FIG. 7A. At this time, since the sum of the increase amounts of the ejection amounts of the fuel supply units 20B and 20C is equal to the decrease amount of the ejection amount of the fuel supply unit 20A, the total ejection amount is kept constant as illustrated in FIG. 7D.

From time t3 to t4, since the ejection amount of the fuel supply unit 20B is kept v1, the ejection amount of the fuel supply unit 20C is kept constant v2, and the ejection amount of the fuel supply unit 20A is zero, the total ejection amount is kept constant (v1+v2) as illustrated in FIG. 7D.

In this manner, the total ejection amount can be made constant by shifting ejection timings of the fuel supply unit 20A and the fuel supply units 20B/20C from each other, while stroke lengths of the fuel supply units 20B/20C are different from that of the fuel supply units 20A.

Figure 8A:
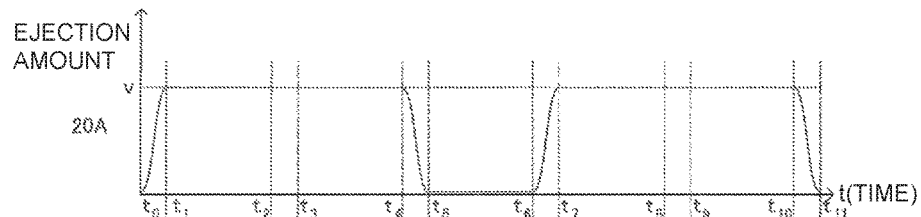
FIG. 8A is another example of a temporal change in the ejection amount of the fuel supply unit 20A.
Figure 8B:
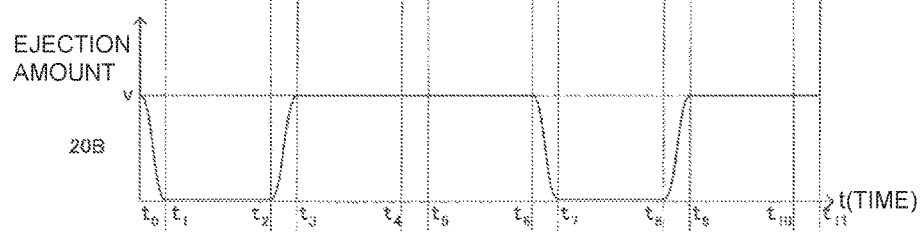
FIG. 8B is another example of a temporal change in the ejection amount of the fuel supply unit 20B.
Figure 8C:
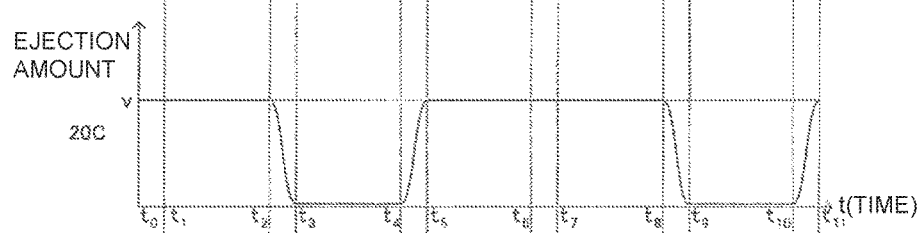
FIG. 8C is another example of a temporal change in the ejection amount of the fuel supply unit 20C.
Figure 8D:
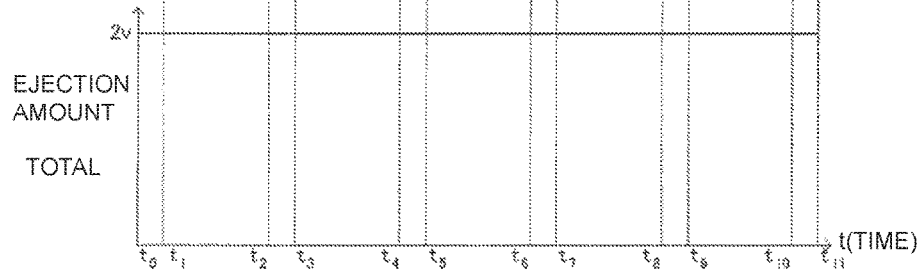
FIG. 8D is a diagram illustrating another example of a temporal change in the total amount of individual ejection amounts by the fuel supply units 20A, 20B, and 20C.

FIG. 8A is a diagram illustrating another example of a temporal change in the ejection amount of the fuel supply unit 20A. FIG. 8B is a diagram illustrating another example of a temporal change in the ejection amount of the fuel supply unit 20B. FIG. 8C is a diagram illustrating another example of a temporal change in the ejection amount of the fuel supply unit 20C. FIG. 8D is a diagram illustrating an example of a temporal change in the total amount of individual ejection amounts by the fuel supply units 20A, 20B, and 20C, in FIGS. 8A to 8C.

From time t0 to time t1, the ejection amount of the fuel supply unit 20A increases as illustrated in FIG. 8A, and at the same time, the ejection amount of the fuel supply unit 20B decreases as illustrated in FIG. 8B. As illustrated in FIG. 8C, the ejection amount of the fuel supply unit 20C is kept constant. At this time, since the increase amount of the ejection amount of the fuel supply unit 20A is equal to the decrease amount of the ejection amount of the fuel supply unit 20B, the total ejection amount is kept constant as illustrated in FIG. 8D.

From time t1 to time t2, since the ejection amounts of the fuel supply units 20A and 20C are kept constant and the ejection amount of the fuel supply unit 20B is zero, the total ejection amount is kept constant as illustrated in FIG. 8D.

From time t2 to time t3, the ejection amount of the fuel supply unit 20B increases as illustrated in FIG. 8B, and at the same time, the ejection amount of the fuel supply unit 20C decreases as illustrated in FIG. 8C. As illustrated in FIG. 8A, the ejection amount of the fuel supply unit 20A is kept constant. At this time, since the increase amount of the ejection amount of the fuel supply unit 20B is equal to the decrease amount of the ejection amount of the fuel supply unit 20C, the total ejection amount is kept constant as illustrated in FIG. 8D.

From time t3 to t4, since the ejection amounts of the fuel supply units 20A and 20B are kept constant and the ejection amount of the fuel supply unit 20C is zero, the total ejection amount is kept constant as illustrated in FIG. 8D.

From time t4 to time t5, the ejection amount of the fuel supply unit 20C increases as illustrated in FIG. 8C, and at the same time, the ejection amount of the fuel supply unit 20A decreases as illustrated in FIG. 8A. As illustrated in FIG. 8A, the ejection amount of the fuel supply unit 20A is kept constant. At this time, since the increase amount of the ejection amount of the fuel supply unit 20C is equal to the decrease amount of the ejection amount of the fuel supply unit 20A, the total ejection amount is kept constant as illustrated in FIG. 8D.

From time t5 to time t6, since the ejection amounts of the fuel supply units 20B and 20C are kept constant and the ejection amount of the fuel supply unit 20A is zero, the total ejection amount is kept constant as illustrated in FIG. 8D.

In this manner, also in cases illustrated in FIGS. 8A to 8D, the control unit 80 controls the controller 21 of each of the fuel supply units 20A, 20B, and 20C such that the total sum of the ejection amounts of the fuel ejected from the boosting cylinder 51 of each of the fuel supply units 20A, 20B, and 20C is kept constant, making it possible to prevent generation of pulsation in high pressure fuel supply pipe 13. Note that when the maximum value of the ejection amounts of the fuel supply units 20A, 20B, and 20C is v, the total ejection amount is kept constant at 2v.

Note that also in FIG. 8, the time interval (n is a natural number) between t(n−1) and tn can be appropriately changed. For example, it is allowable, by lengthening the stroke of the boosting piston 52, to increase the time interval between t(n−1) and tn while maintaining the speed of the boosting piston 52 constant (maintaining the ejection amount constant). For example, in FIG. 4, the time from t1 to t2 may be twice the time from t3 to t4, or twice the time from t5 to t6.

Note that while in FIGS. 4 and 8, the waveforms of the ejection amounts of the fuel supply units 20A, 20B, and 20C are identical and the phases are mutually different, the waveforms of the ejection amounts of the fuel supply units 20A, 20B, and 20C may be mutually different, and the maximum values of the ejection amounts of the fuel supply units 20A, 20B, 20C may be mutually different.

Figure 9A:
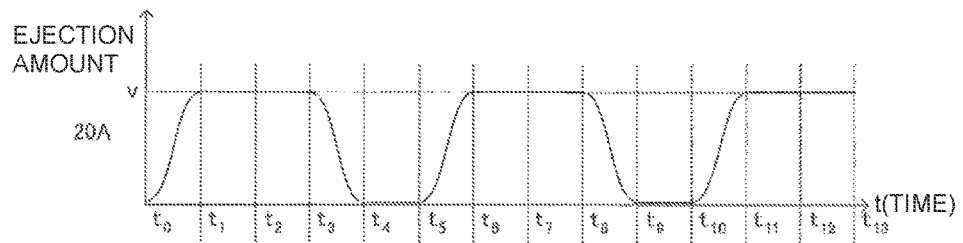
FIG. 9A is another example of a temporal change in the ejection amount of the fuel supply unit 20A.
Figure 9B:
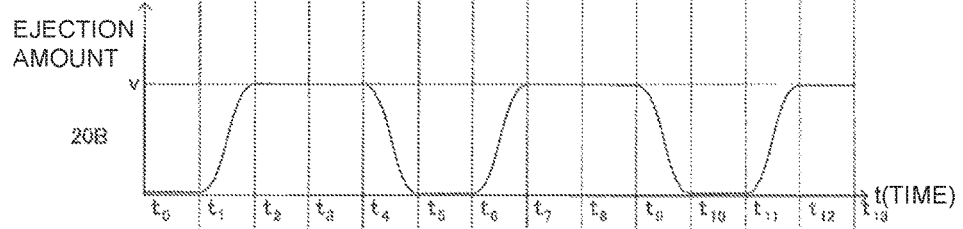
FIG. 9B is another example of a temporal change in the ejection amount of the fuel supply unit 20B.
Figure 9C:
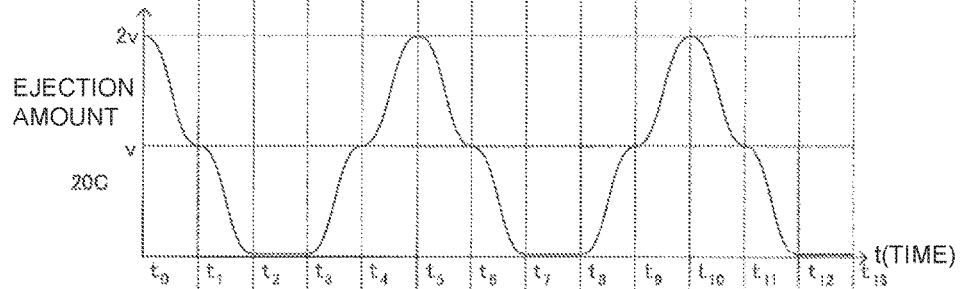
FIG. 9C is another example of a temporal change in the ejection amount of the fuel supply unit 20C.
Figure 9D:
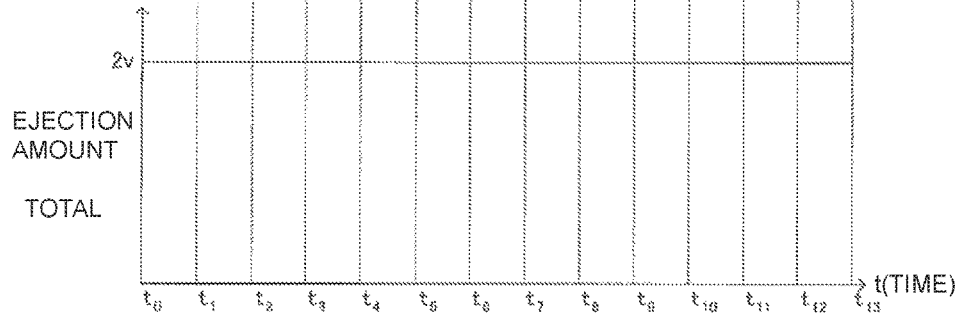
FIG. 9D is a diagram illustrating another example of a temporal change in the total amount of individual ejection amounts by the fuel supply units 20A, 20B, and 20C.

FIG. 9A is a diagram illustrating another example of a temporal change in the ejection amount of the fuel supply unit 20A. FIG. 9B is a diagram illustrating another example of a temporal change in the ejection amount of the fuel supply unit 20B. FIG. 9C is a diagram illustrating another example of a temporal change in the ejection amount of the fuel supply unit 20C. FIG. 9D is a diagram illustrating an example of a temporal change in the total amount of individual ejection amounts by the fuel supply units 20A, 20B, and 20C, in FIGS. 9A to 9C. From time t0 to time t1, the ejection amount of the fuel supply unit 20A increases as illustrated in FIG. 9A, and at the same time, the ejection amount of the fuel supply unit 20C decreases as illustrated in FIG. 9C. As illustrated in FIG. 9B, the ejection amount of the fuel supply unit 20B is zero. At this time, since the increase amount of the ejection amount of the fuel supply unit 20A is equal to the decrease amount of the ejection amount of the fuel supply unit 20C, the total ejection amount is kept constant as illustrated in FIG. 9D.

From time t1 to time t2, the ejection amount of the fuel supply unit 20B increases as illustrated in FIG. 9B, and at the same time, the ejection amount of the fuel supply unit 20C decreases as illustrated in FIG. 9C. As illustrated in FIG. 9A, the ejection amount of the fuel supply unit 20A is kept constant. At this time, since the increase amount of the ejection amount of the fuel supply unit 20B is equal to the decrease amount of the ejection amount of the fuel supply unit 20C, the total ejection amount is kept constant as illustrated in FIG. 9D.

From time t2 to t3, since the ejection amounts of the fuel supply units 20A and 20B are kept constant as illustrated in FIGS. 9A and 9B, and the ejection amount of the fuel supply unit 20C is zero as illustrated in FIG. 9C, the total ejection amount is kept constant as illustrated in FIG. 9D.

From time t3 to time t4, the ejection amount of the fuel supply unit 20C increases as illustrated in FIG. 9C, and at the same time, the ejection amount of the fuel supply unit 20A decreases as illustrated in FIG. 9A. As illustrated in FIG. 9B, the ejection amount of the fuel supply unit 20B is kept constant. At this time, since the increase amount of the ejection amount of the fuel supply unit 20C is equal to the decrease amount of the ejection amount of the fuel supply unit 20A, the total ejection amount is kept constant as illustrated in FIG. 9D.

From time t4 to time t5, the ejection amount of the fuel supply unit 20C increases as illustrated in FIG. 9C, and at the same time, the ejection amount of the fuel supply unit 20B decreases as illustrated in FIG. 9B. As illustrated in FIG. 9A, the ejection amount of the fuel supply unit 20A is zero. At this time, since the increase amount of the ejection amount of the fuel supply unit 20C is equal to the decrease amount of the ejection amount of the fuel supply unit 20B, the total ejection amount is kept constant as illustrated in FIG. 9D.

In this manner, also in cases illustrated in FIGS. 9A to 9D, the control unit 80 controls the controller 21 of each of the fuel supply units 20A, 20B, and 20C such that the total sum of the ejection amounts of the fuel ejected from the boosting cylinder 51 of each of the fuel supply units 20A, 20B, and 20C is kept constant, making it possible to prevent generation of pulsation in high pressure fuel supply pipe 13. Note that when the maximum value of the ejection amounts of the fuel supply units 20A and 20B is v, and the maximum value of the ejection amount of the fuel supply unit 20C is 2v, the total ejection amount is kept constant at 2v. In this manner, the total ejection amount can be made constant by shifting ejection timings of the fuel supply unit 20A, 20B, and 20C from each other, while the fuel supply units 20A/20B and the fuel supply unit 20C have mutually different stroke lengths and different speeds of the boosting piston 52.

Note that in the case of using a servo motor, it is possible to switch the moving direction of the hydraulic piston 42 by switching the flow direction of the hydraulic fluid to be supplied into the hydraulic cylinder 41 in accordance with the direction of forward/reverse rotation of the hydraulic pump 32. In this case, since the flow direction of the hydraulic fluid is not switched by any direction switching valve, there is no need to continuously drive the hydraulic pump 32 at a rated rotation speed, making it possible to decrease energy consumption compared with the case where the hydraulic pump 32 is continuously driven at the rated rotation speed.

Moreover, since the plurality of fuel supply units 20A, 20B, and 20C are provided in parallel with each other between the low pressure fuel supply pipe 12 and the high pressure fuel supply pipe 13, the number of fuel supply units can be easily changed. Moreover, even when trouble occurs in any one of the plurality of fuel supply units or maintenance is performed, it is possible to remove the corresponding fuel supply unit while continuously driving other fuel supply units.

Moreover, by providing a position sensor for detecting the position of the boosting piston 52, it is possible to reliably adjust the speed and position of the boosting piston 52.

Note that while the above description is the case of using three fuel supply units 20A, 20B, and 20C, the present technology is not limited to this, and any number of fuel supply units can be used. For example, in addition to the three fuel supply units 20A, 20B, and 20C, an auxiliary fuel supply unit may be further provided. In this case, it is allowable to configure such that, while mainly using the three fuel supply units 20A, 20B, and 20C, fuel is ejected from the auxiliary fuel supply unit so as to make up for the decrease amount in the ejection amount in a case where the total ejection amount from the three fuel supply units 20A, 20B, and 20C decreases for some reason.

Moreover, the shape of the reciprocating pump 50 is not limited to the one illustrated in FIGS. 2 and 3, but a reciprocating pump having an arbitrary shape can be used.

Moreover, while the above description is a case of the fuel supply device mounted on a ship, the present technology is not limited to this. The linear actuator 30 and the reciprocating pump 50 can be installed on any structure. For example, the linear actuator 30 and the reciprocating pump 50 may be mounted on a vehicle body of an automobile, or the linear actuator 30 and the reciprocating pump 50 may be installed on a floor of a building frame.

<Modification Example>

Figure 10:
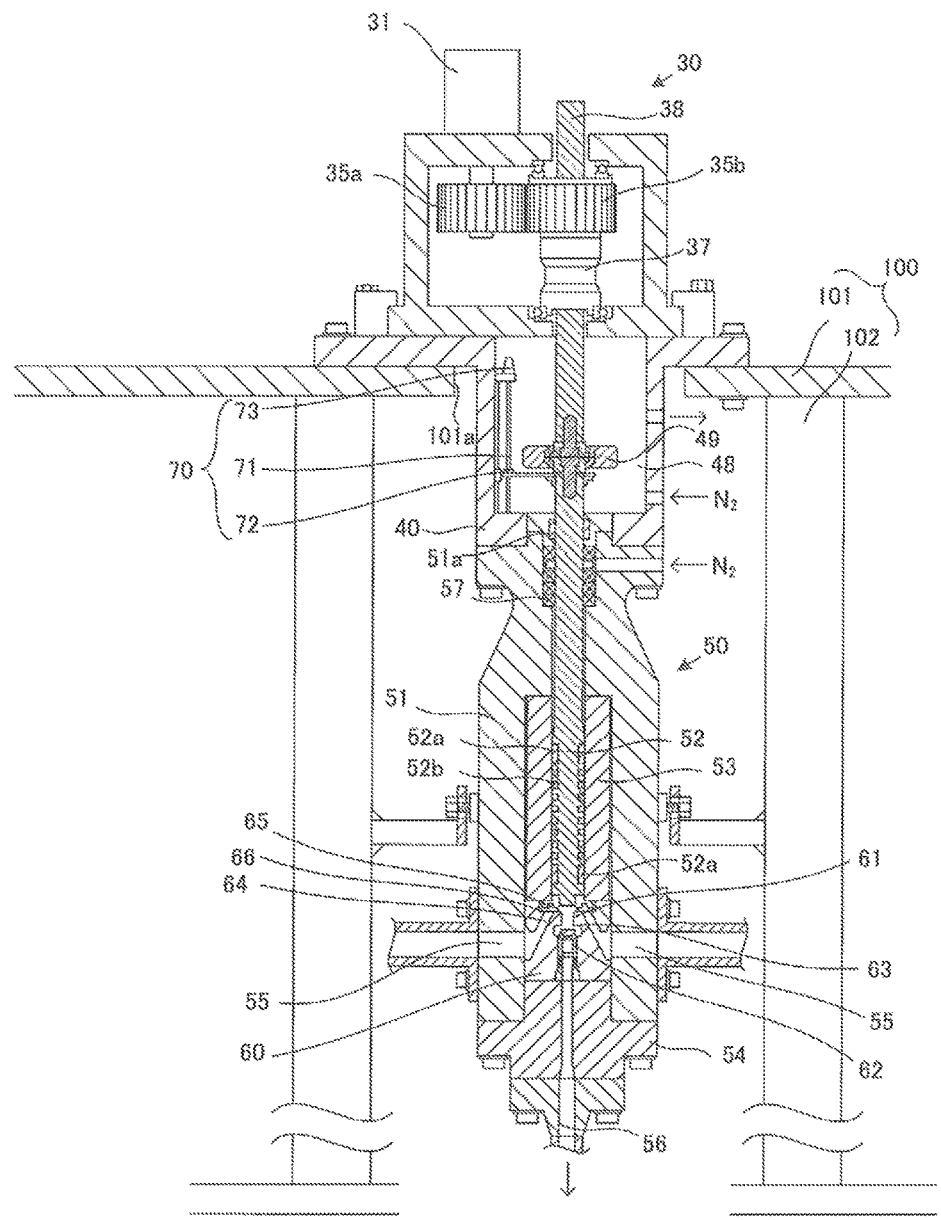
FIG. 10 is a diagram illustrating a fuel supply unit using an electric cylinder unit as the linear actuator 30.
Figure 11A:
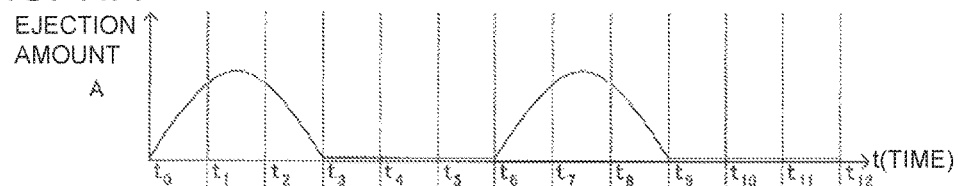
FIGS. 11A, 11B, and 11C are diagrams illustrating examples of temporal changes in the ejection amounts of the individual reciprocating pumps in a case where three reciprocating pumps are driven using the crankshaft.
Figure 11B:
Figure 11C:
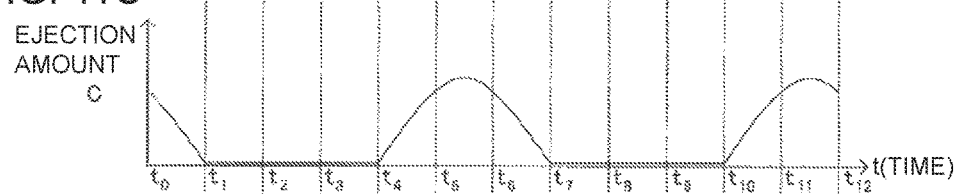
Figure 11D:
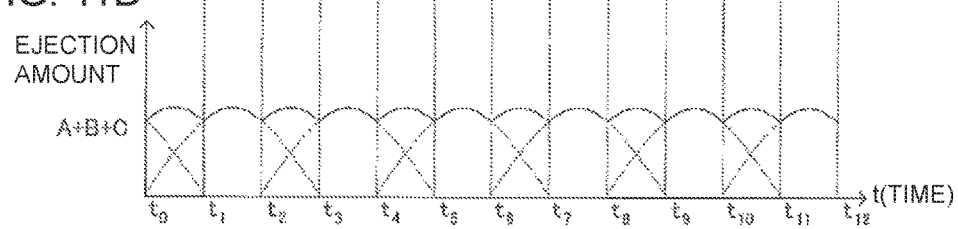
FIG. 11D is a diagram illustrating a temporal change of the total ejection amounts of 11A, 11B, and 11C.

FIG. 10 is a diagram illustrating a fuel supply unit using an electric cylinder unit as the linear actuator 30. Note that the same reference numerals are given to the configurations similar to the configurations in FIGS. 2 and 3 and description thereof will be omitted.

The electric cylinder unit includes an electric motor 31, gears 35a and 35b, a ball nut 37, and a ball screw 38.

The gear 35a is rotated by the power of the electric motor 31, and the rotation of the gear 35a is transmitted to the gear 35b.

The gear 35b is provided integrally with the ball nut 37, and transmits the rotation of the gear 35a to the ball nut 37.

The ball nut 37 is screwed with the ball screw 38 and rotates together with the gear 35b.

The lower end of the ball screw 38 is coupled to the upper end of the boosting piston 52 via the coupling portion 49. Rotation of the ball nut 37 causes the ball screw 38 to move in the axial direction. Movement of the ball screw 38 in the axial direction causes the boosting piston 52 to move in the axial direction.

In this modification example, it is possible to achieve an effect similar to the case of using the hydraulic cylinder unit as the linear actuator 30.

In a case where the pump installation location is a non-explosion-proof location or in a Zone-2 (Class I Division 2) hazard location, the rotation of the electric motor 31 may be transmitted to the ball nut using a pulley and a timing belt instead of the gears 35a and 35b.

The invention claimed is:

1. A fuel supply device for supplying fuel into a combustion chamber of an internal combustion engine, the fuel supply device comprising:
a low pressure fuel supply pipe to which a low pressure fuel is supplied;
a high pressure fuel supply pipe to which high pressure fuel to be supplied into the combustion chamber is supplied;
a plurality of fuel supply units provided between the low pressure fuel supply pipe and the high pressure fuel supply pipe, each of the fuel supply units being configured to suck and boost the fuel in the low pressure fuel supply pipe and supply the boosted fuel to the high pressure fuel supply pipe; and
a control unit configured to generate a control signal to control the plurality of fuel supply units,
wherein each of the fuel supply units includes:
a linear actuator;
a reciprocating pump having a boosting piston driven by the linear actuator to reciprocate in an axial direction, the reciprocating pump being configured to suck the fuel when the boosting piston moves in a first direction in the axial direction and configured to boost and eject the fuel when the boosting piston moves in a second direction in the axial direction; and
a controller controlled by the control unit and configured to drive the linear actuator, and
the control unit being configured to control, via the controller, the plurality of fuel supply units by outputting the control signal for driving the linear actuator, the control signal including information that a reciprocating cycle time of the boosting piston is in common in the plurality of fuel supply units, and that
acceleration of the boosting piston in the second direction in one fuel supply unit is started, when deceleration of the boosting piston in the second direction in at least one other fuel supply unit is started, and
acceleration of the boosting piston in the second direction in one fuel supply unit is finished, when deceleration of the boosting piston in the second direction in at least one other fuel supply unit is finished,
in order to keep a total amount of ejection of the fuel ejected from the plurality of fuel supply units per unit time a constant value by decreasing an ejection amount of the fuel per unit time by decelerating a moving speed of the boosting piston in the second direction in the other fuel supply unit while an ejection amount of the fuel per unit time from the one fuel supply unit increases by accelerating a moving speed of the boosting piston in the second direction during one reciprocation movement of the boosting piston of the at least one fuel supply unit, and that
deceleration of the boosting piston in the second direction in the one fuel supply unit is started when acceleration of the boosting piston in the second direction in at least the one other fuel supply unit is started, and
deceleration of the boosting piston in the second direction in the one fuel supply unit is finished when acceleration of the boosting piston in the second direction in at least one other fuel supply unit is finished,
in order to keep a total amount of ejection of the fuel ejected from the plurality of fuel supply units per unit time a constant value by increasing an ejection amount of the fuel per unit time by accelerating a moving speed of the boosting piston in the second direction in the other fuel supply unit while an ejection amount of the fuel per unit time from the one fuel supply unit decreases by decelerating a moving speed of the boosting piston in the second direction during one reciprocation movement of the boosting piston in the one fuel supply unit.

2. The fuel supply device according to claim 1, wherein the control unit is configured to control the plurality of fuel supply units by outputting the control signal, the control signal including information that a sum of an increase amount of an ejection amount of the fuel from a fuel supply unit or fuel supply units in which the ejection amount of the fuel is increasing matches a sum of a decrease amount of an ejection amount of the fuel from another fuel supply unit or other fuel supply units in which the ejection amount of the fuel is decreasing.

3. The fuel supply device according to claim 1, wherein the linear actuator is a hydraulic cylinder unit, the hydraulic cylinder unit including:
a hydraulic cylinder having a hydraulic fluid accommodation space for accommodating hydraulic fluid and arranged such that an axial direction of the hydraulic cylinder is aligned with the axial direction of the boosting piston;

a hydraulic piston movably arranged in the axial direction within the hydraulic cylinder, and configured to partition the hydraulic fluid accommodation space into a first chamber and a second chamber;

a piston rod configured to couple the hydraulic piston with the boosting piston;

a hydraulic pump configured to move the hydraulic piston in a first direction in the axial direction by supplying hydraulic fluid to the first chamber and to move the hydraulic piston in a second direction in the axial direction by supplying hydraulic fluid to the second chamber; and an electric motor configured to drive the hydraulic pump such that the hydraulic piston reciprocates in the axial direction, and the controller is configured to control a movement of the hydraulic piston within the hydraulic cylinder by driving the electric motor.

4. The fuel supply device according to claim 3, wherein the hydraulic cylinder unit further includes:

a first hydraulic pipe with an internal space closed therein, the first hydraulic pipe having one end connected to the hydraulic pump and the other end connected to the first chamber and configured to direct all the hydraulic fluid ejected from the hydraulic pump toward the first chamber for supply and configured to return all the hydraulic fluid discharged from the first chamber toward the hydraulic pump; and a second hydraulic pipe with an internal space closed therein, the second hydraulic pipe having one end connected to the hydraulic pump and the other end connected to the second chamber and configured to supply to the second chamber the hydraulic fluid of an identical amount discharged from the first chamber and configured to discharge from the second chamber the hydraulic fluid of an identical amount supplied to the first chamber.

5. The fuel supply device according to claim 3, wherein the piston rod extends from the hydraulic piston in the first direction and protrudes to an outside of the first chamber and extends from the hydraulic piston in the second direction and protrudes to an outside of the second chamber, and a cross-sectional area of the piston rod perpendicular to a longitudinal direction of the first chamber is equal to a cross-sectional area of the piston rod perpendicular to a longitudinal direction of the second chamber.

6. The fuel supply device according to claim 3, wherein the hydraulic pump supplies hydraulic fluid to the second chamber such that pressure of the fuel ejected from the reciprocating pump is 5 MPa to 100 MPa.

7. The fuel supply device according to claim 1, wherein the linear actuator is an electric cylinder unit, and includes:

an electric motor;

a ball nut configured to rotate by a power of an electric motor; and a ball screw to which the ball nut is screwed, being coupled with the boosting piston, an axial direction of the ball screw is aligned with the axial direction of the boosting piston, and configured to move in the axial direction of the ball screw by rotation of the ball nut, and the controller is configured to control a movement of the ball screw in the axial direction by controlling the electric motor.

8. A fuel supply method for supplying fuel into a combustion chamber of an internal combustion engine, the fuel supply method comprising:

sucking and boosting fuel in a low pressure fuel supply pipe to which a low pressure fuel is supplied and supplying the boosted fuel to a high pressure fuel supply pipe to which high pressure fuel to be supplied into the combustion chamber is supplied, by using a plurality of fuel supply units provided between the low pressure fuel supply pipe and the high pressure fuel supply pipe, each of the plurality of fuel supply units being provided with a reciprocating pump having a boosting piston configured to reciprocate in an axial direction thereof, the reciprocating pump being configured to suck the fuel when the boosting piston moves in a first direction in the axial direction and configured to boost and eject the fuel when the boosting piston moves in a second direction in the axial direction;

controlling the plurality of fuel supply units such that a reciprocating cycle time of the boosting piston is in common in the plurality of fuel supply units, and such that acceleration of the boosting piston in the second direction in one fuel supply unit is started when deceleration of the boosting piston in the second direction in at least one other fuel supply unit is started, and acceleration of the boosting piston in the second direction in one fuel supply unit is finished when deceleration of the boosting piston in the second direction in at least one other fuel supply unit is finished, in order to keep a total amount of ejection of the fuel ejected from the plurality of fuel supply units per unit time a constant value by decreasing an ejection amount of the fuel per unit time by decelerating a moving speed of the boosting piston in the second direction in the other fuel supply unit while an ejection amount of the fuel per unit time from the one fuel supply unit increases by accelerating a moving speed of the boosting piston in the second direction during one reciprocation movement of the boosting piston of the at least one fuel supply unit, and such that deceleration of the boosting piston in the second direction in the one fuel supply unit is started when acceleration of the boosting piston in the second direction in at least the one other fuel supply unit is started, and deceleration of the boosting piston in the second direction in the one fuel supply unit is finished when acceleration of the boosting piston in the second direction in at least one other fuel supply unit is finished, in order to keep a total amount of ejection of the fuel ejected from the plurality of fuel supply units per unit time a constant value by increasing an ejection amount of the fuel per unit time by accelerating a moving speed of the boosting piston in the second direction in the other fuel supply unit while an ejection amount of the fuel per unit time from the one fuel supply unit decreases by decelerating a moving speed of the boosting piston in the second direction during one reciprocation movement of the boosting piston in the one fuel supply unit.

* * * * *